Dec. 22, 1953 V. J. JANDASEK 2,663,148

BLADING FOR HYDRAULIC TORQUE CONVERTERS

Filed Dec. 12, 1950 21 Sheets-Sheet 1

Inventor:
Vladimir J. Jandasek
By: Edward C. Gritzbaugh
Atty.

BLADING FOR HYDRAULIC TORQUE CONVERTERS

Filed Dec. 12, 1950

Inventor:
Vladimir J. Jandasek
By: Edward C. Fitzhugh
Atty.

Dec. 22, 1953 V. J. JANDASEK 2,663,148

BLADING FOR HYDRAULIC TORQUE CONVERTERS

Filed Dec. 12, 1950

21 Sheets-Sheet 3

Inventor:
Vladimir J. Jandasek
By: Edward C. Fitzhenry Atty.

Dec. 22, 1953 V. J. JANDASEK 2,663,148

BLADING FOR HYDRAULIC TORQUE CONVERTERS

Filed Dec. 12, 1950 21 Sheets-Sheet 4

Inventor:
Vladimir J. Jandasek
By: [signature]
Atty.

Inventor:
Vladimir J. Jandasek
Edward C. Fitzhaugh
Atty.

Dec. 22, 1953 V. J. JANDASEK 2,663,148

BLADING FOR HYDRAULIC TORQUE CONVERTERS

Filed Dec. 12, 1950 21 Sheets-Sheet 6

PUMP

TURBINE.

Inventor:
Vladimir J. Jandasek
By: Edward C. Fitzhampton
Atty.

BLADING FOR HYDRAULIC TORQUE CONVERTERS

Filed Dec. 12, 1950 21 Sheets-Sheet 7

Inventor:
Vladimir J. Jandasek
By: Edward C. Gritzbaugh
Atty.

Dec. 22, 1953 V. J. JANDASEK 2,663,148

BLADING FOR HYDRAULIC TORQUE CONVERTERS

Filed Dec. 12, 1950 21 Sheets-Sheet 8

Inventor:
Vladimir J. Jandasek
By: Edward C. Fitzharris
Atty.

Dec. 22, 1953 V. J. JANDASEK 2,663,148

BLADING FOR HYDRAULIC TORQUE CONVERTERS

Filed Dec. 12, 1950 21 Sheets-Sheet 9

Inventor:
Vladimir J. Jandasek
By Edward C. Fitzhamy?
Atty.

Dec. 22, 1953 V. J. JANDASEK 2,663,148

BLADING FOR HYDRAULIC TORQUE CONVERTERS

Filed Dec. 12, 1950 21 Sheets-Sheet 10

Inventor:
Vladimir J. Jandasek
By: [signature] Atty.

Dec. 22, 1953 V. J. JANDASEK 2,663,148

BLADING FOR HYDRAULIC TORQUE CONVERTERS

Filed Dec. 12, 1950 21 Sheets-Sheet 11

Inventor:
Vladimir J. Jandasek
By: Edward C. Fitzgerald
Atty.

Dec. 22, 1953

V. J. JANDASEK 2,663,148

BLADING FOR HYDRAULIC TORQUE CONVERTERS

Filed Dec. 12, 1950

21 Sheets-Sheet 12

Inventor:
Vladimir J. Jandasek
By Edward C. Fitzgerald
Atty.

Dec. 22, 1953 V. J. JANDASEK 2,663,148

BLADING FOR HYDRAULIC TORQUE CONVERTERS

Filed Dec. 12, 1950 21 Sheets-Sheet 13

Inventor:
Vladimir J. Jandasek
By: Edward C. Fitzgerald
Atty.

Dec. 22, 1953 V. J. JANDASEK 2,663,148

BLADING FOR HYDRAULIC TORQUE CONVERTERS

Filed Dec. 12, 1950 21 Sheets-Sheet 14

Inventor:
Vladimir J. Jandasek
By: Edward C. Fitzgerald
Atty.

Dec. 22, 1953 V. J. JANDASEK 2,663,148

BLADING FOR HYDRAULIC TORQUE CONVERTERS

Filed Dec. 12, 1950 21 Sheets-Sheet 15

Inventor:
Vladimir J. Jandasek
By [signature]
Atty.

Dec. 22, 1953 V. J. JANDASEK 2,663,148
BLADING FOR HYDRAULIC TORQUE CONVERTERS
Filed Dec. 12, 1950 21 Sheets-Sheet 16

Inventor:
Vladimir J. Jandasek
By: Edward C. Fitzhugh
Atty

Dec. 22, 1953 V. J. JANDASEK 2,663,148

BLADING FOR HYDRAULIC TORQUE CONVERTERS

Filed Dec. 12, 1950 21 Sheets-Sheet 17

Inventor:
Vladimir J. Jandasek
By: Edward C. Fitzgerald
Atty.

BLADING FOR HYDRAULIC TORQUE CONVERTERS

Inventor:
Vladimir J. Jandasek
By [signature] Atty

Inventor:
Vladimir J. Jandasek
By: Edward C. Fitzgerald
Atty.

Dec. 22, 1953 V. J. JANDASEK 2,663,148

BLADING FOR HYDRAULIC TORQUE CONVERTERS

Filed Dec. 12, 1950 21 Sheets-Sheet 20

Inventor:
Vladimir J. Jandasek
By Edward C. Fitzhugh
Atty.

Dec. 22, 1953 V. J. JANDASEK 2,663,148

BLADING FOR HYDRAULIC TORQUE CONVERTERS

Filed Dec. 12, 1950 21 Sheets-Sheet 21

Inventor:
Vladimir J. Jandasek
By Edward C. Fitzharris
Atty.

Patented Dec. 22, 1953

2,663,148

UNITED STATES PATENT OFFICE 2,663,148

BLADING FOR HYDRAULIC TORQUE CONVERTERS

Vladimir J. Jandasek, Detroit, Mich., assignor to Borg-Warner Corporation, Chicago, Ill., a corporation of Illinois Application December 12, 1950, Serial No. 200,319

12 Claims. (Cl. 60—54)

This invention relates to hydraulic torque converters of the type comprising pump, turbine, and reaction members.

It is a primary object of the invention to provide a hydraulic torque converter having the blade curvatures of pump, turbine, and reaction members thereof, capable of effecting the transmission of power by the kinetic energy of a fluid at varying speeds such that any applied driving speed and torque will be translated into a driven speed and torque, of which the torque varies automatically in accordance with the load and the speed varies inversely as the torque.

Hydraulic torque converters in their simplest form include a driving pump, a driven turbine, and a reaction member, each comprising enclosing substantially semi-toroidal walls with interior fluid ducts or passages defined by blades, the pump and turbine being relatively rotatable about a common axis, with a permanent fluid mass confined to flow around a closed toroidal circuit, first outwardly with respect to the rotation of the axis through the pump ducts and discharged with an axial component from exit portions thereof into entrances of the turbine ducts and thence radially inwardly in the turbine ducts and axially through the stationary reaction member which acts as a fulcrum by changing direction of the fluid. Such torque converters having a single pump and turbine are commonly identified as the single stage type and are desirable, in automotive vehicles, over types of converters having two or more stages, including multiple pumps and/or turbines, capable of providing higher initial torque ratios, due to the complexity of the latter type of torque converter and its attendant increased manufacturing costs.

Heretofore, the blades of the pump have been conventionally designed with curvatures involving the blade delivery ends, forming the outer fluid exit portions of the ducts, being curved backwardly relative to the direction of rotation of the pump for directively deflecting the fluid also backwards at a substantial angle and tangentially as a high velocity continuous annular stream into the adjacent entrance portions of the turbine ducts and against the turbine blades, which blades are also usually curved in a direction backwardly relative to the direction of rotation of the pump, the pump and turbine blades being designed for smallest possible shock losses. This curvature characteristic of the pump blades has certain disadvantages in their use in torque converters for passenger and truck automobiles. More particularly, torque converters cannot exceed certain diametrical and axial dimensions prescribed by passenger and truck automobile manufacturers due to space limitations for transmissions in their automobiles. These size factors, for a given torque ratio at stall, are critical in the adaptation of torque converters to the space limitations prescribed by automobile manufacturers for the transmissions of their automobiles. The high torque ratio (at stall), realized by converters using backwardly bent impeller pump blades, is generally satisfactory for power units capable of providing continually high input speeds at stall and throughout a substantial portion of the torque conversion range of the torque converter, and where there are no critical size limitations of the torque converter as in automotive installations. However, size factors, and the continuous high input speeds required of internal combustion engines, make these torque converters generally unacceptable for automotive passenger and truck installations. In other words, a torque converter employing the backwardly bent pump blades results in a unit which is too large and/or also results in an excessively high engine input speed, in passenger and truck automobiles, in relation to a predetermined generally acceptable initial torque ratio (at stall) and in the torque conversion range of the converter, besides causing considerable converter noise annoying to the driver. For these reasons, such torque converters have been unsatisfactory for use in automobiles now on the market and commonly provided with engines having between 80 to 150 horsepower ratings.

The present invention is directed to and has for one of its objects, the provision of an improved hydraulic torque converter including pump, turbine and reaction members including blade curvatures of novel design and specifically designed to provide an adequate torque ratio at stall and throughout the torque conversion range, as well as to provide high efficiency in this range and in the coupling range of the torque converter, within prescribed size limitations and at engine speeds satisfactory to automobile manufacturers. One of the features of my torque converter is the employment of pump blades curved, at their fluid discharge portions, in a forward direction relative to the direction of rotation of the pump. The primary advantages of torque converters, including this type of pump blades, are high torque-transmitting capacity and high efficiency, particularly in the high speed ratio range of the converter. The described angular inclination of the blade discharge portions of the pump provides a pump having high capacity realized by the blade discharge portions increasing the tangential component of the absolute velocity of the fluid and thereby the kinetic energy of the fluid, with consequent greater ability to transmit torque than pump blade discharge portions backwardly bent relative to the direction of rotation of the pump under like conditions, including the important factor that, for substantially a 2:1 torque ratio at stall, the increased ability to transmit torque by the torque converter of the present invention allows the same not only to be smaller in size than a torque converter utilizing backwardly bent pump blades but to provide substantially the same stall torque ratio at considerably lower engine input speeds. The increased capacity of my pump extends through the entire torque conversion range of the converter, and through a major part of the coupling range of the converter, i. e., where the torque ratio is substantially 1:1, without sacrificing the desirable efficiency characteristics of either a coupling or torque converter. It is, of course, a requirement of obtaining the foregoing advantages of my pump blade design that the blades of my turbine and reaction members be specifically designed for use with such pump, if optimum results are to be obtained.

These and other objects and advantages of the invention will appear more clearly from the following specification in connection with the accompanying drawings, in which.

Figure 1:
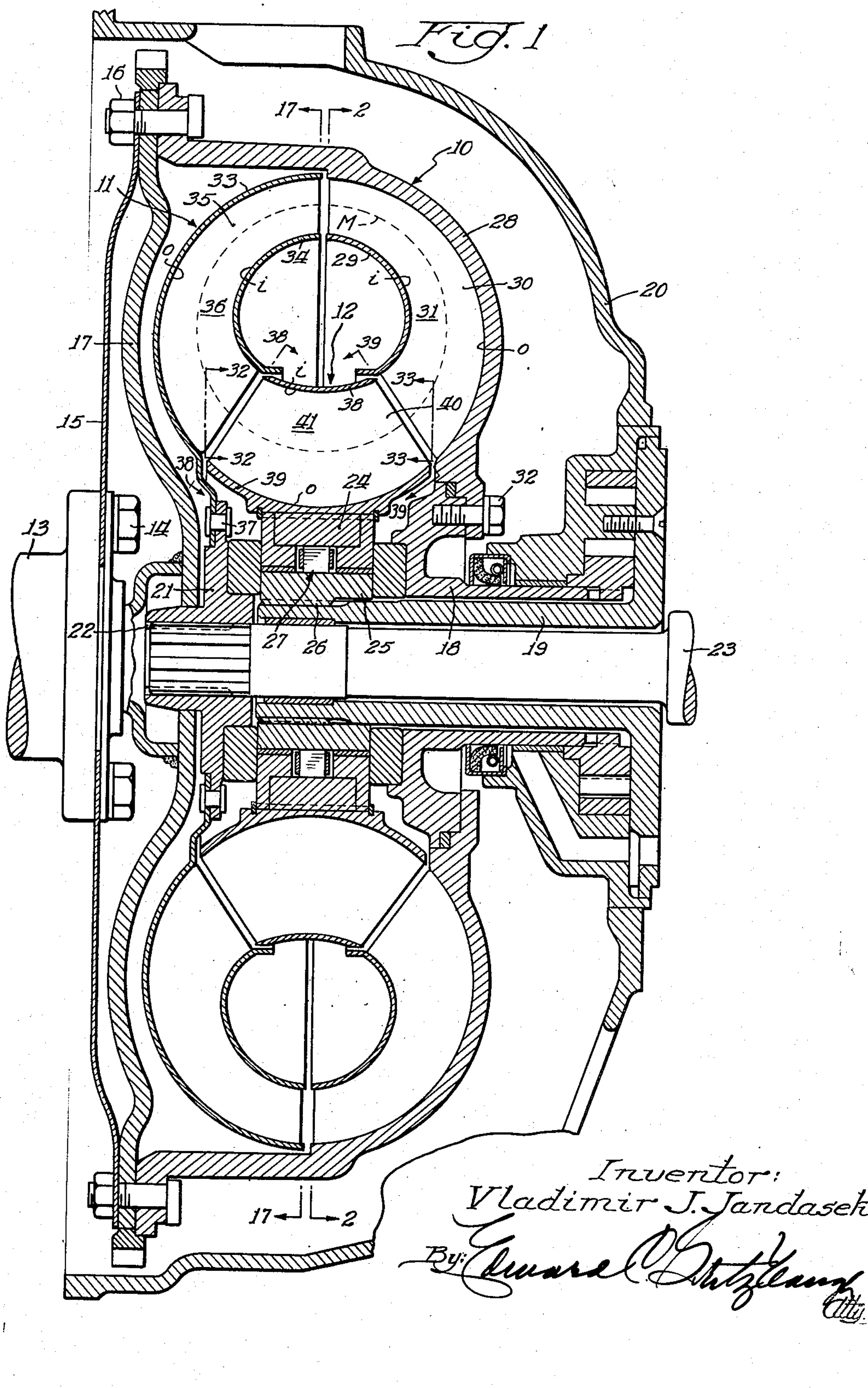
Fig. 1 is a longitudinal section through a hydraulic torque converter embodying pump, turbine and reaction member blades of the present invention.
Figure 3:
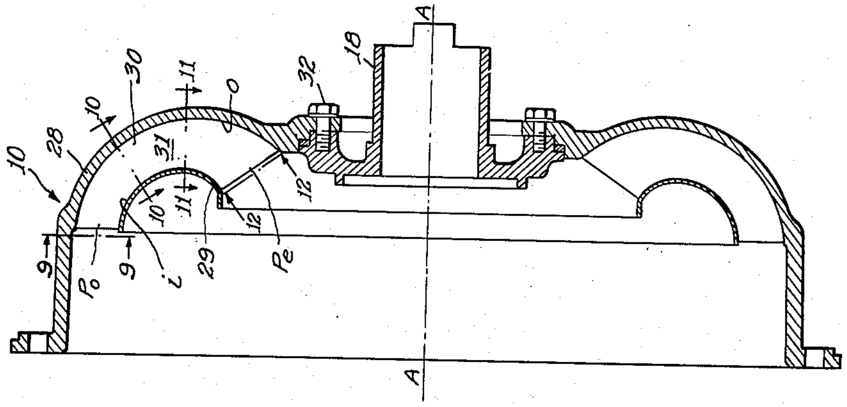
Fig. 3 is a sectional view of the pump shown in Fig. 2, said view being taken on line 3—3 of Fig. 2.
Figure 5:
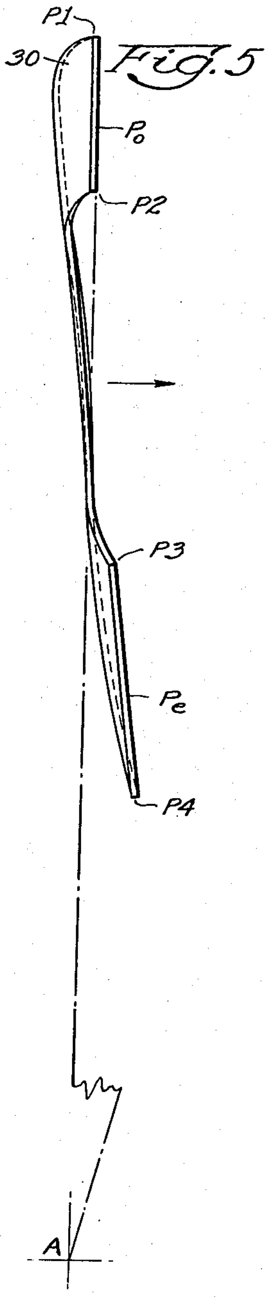
Fig. 5 is a view of one of the similar pump blades shown in Fig. 4.
Figures 6, 7, 8:
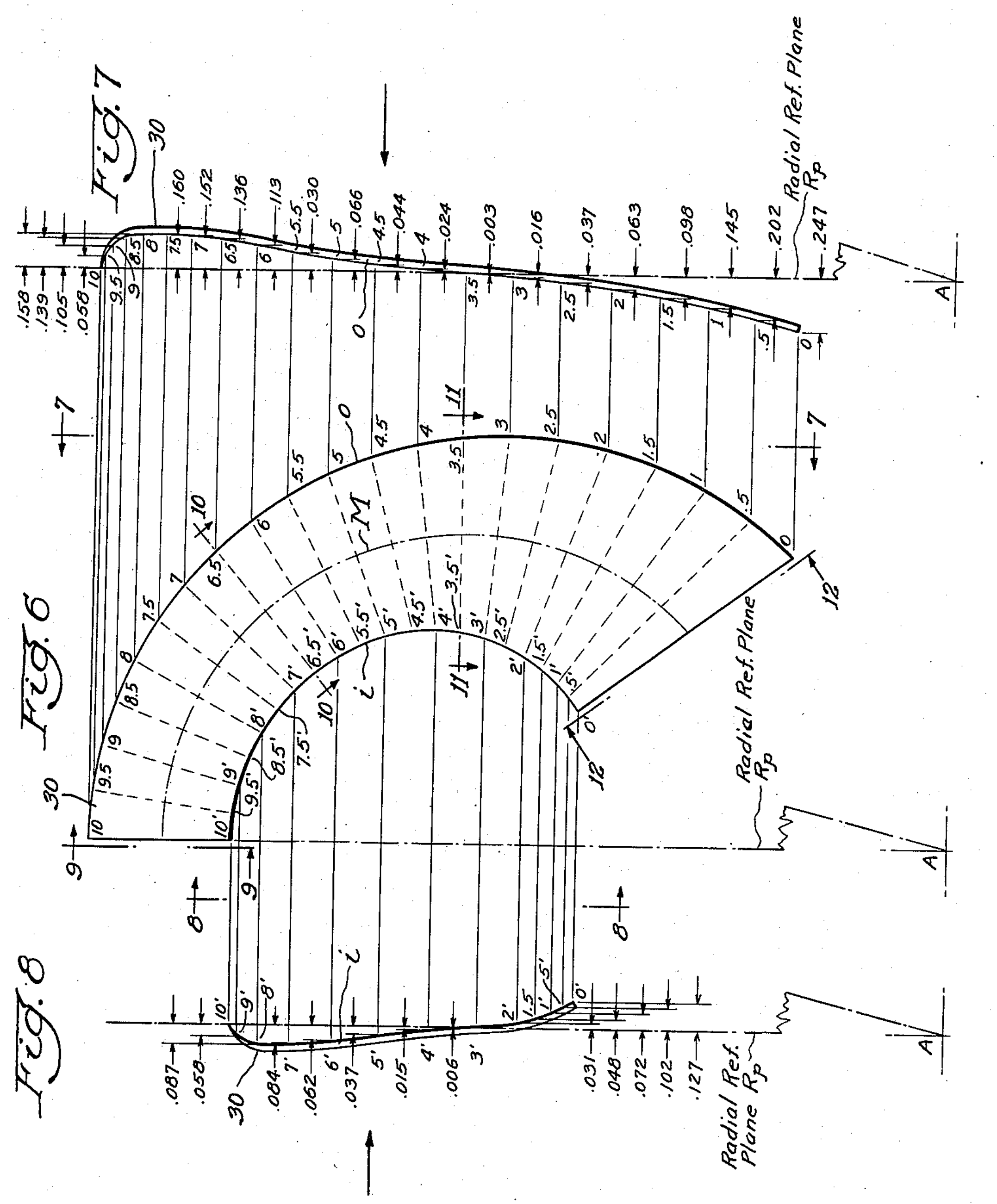
Figure 17:
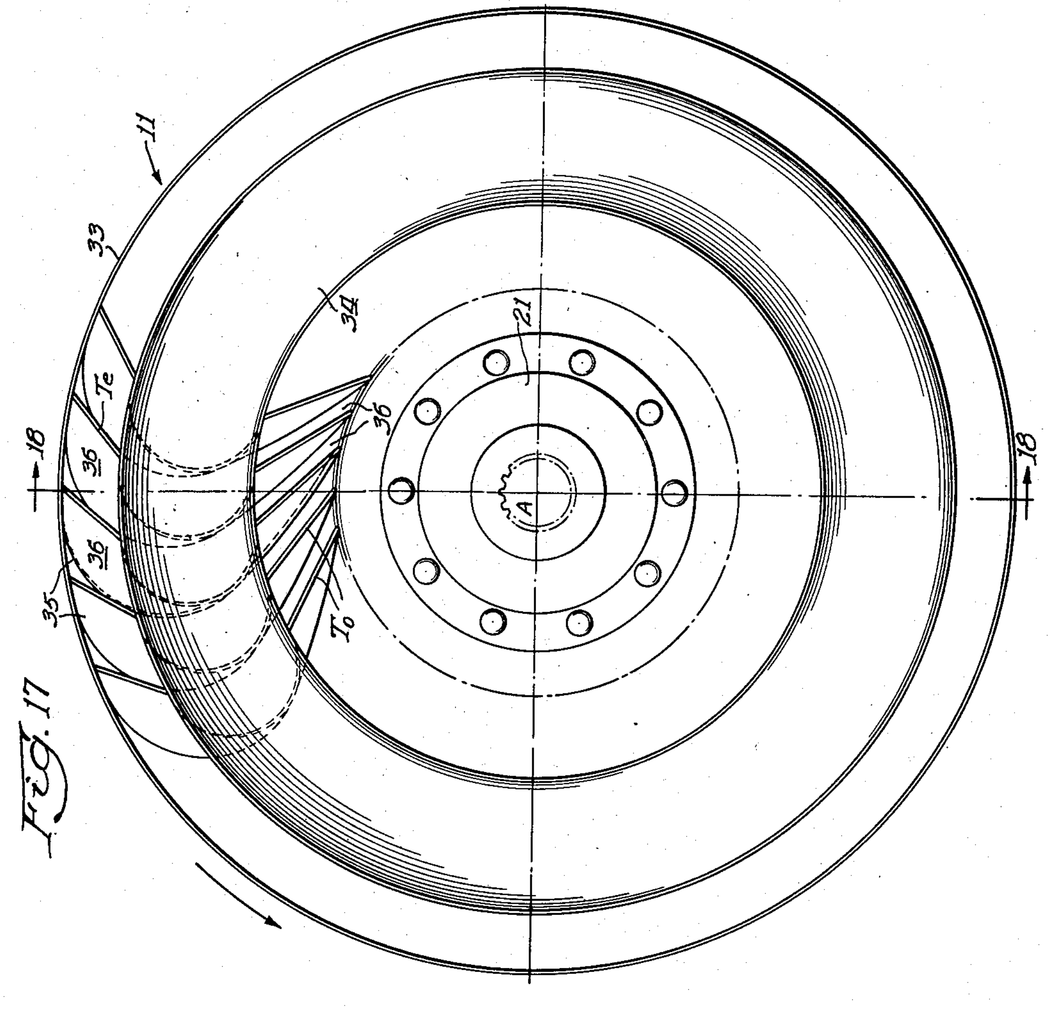
Figure 18:
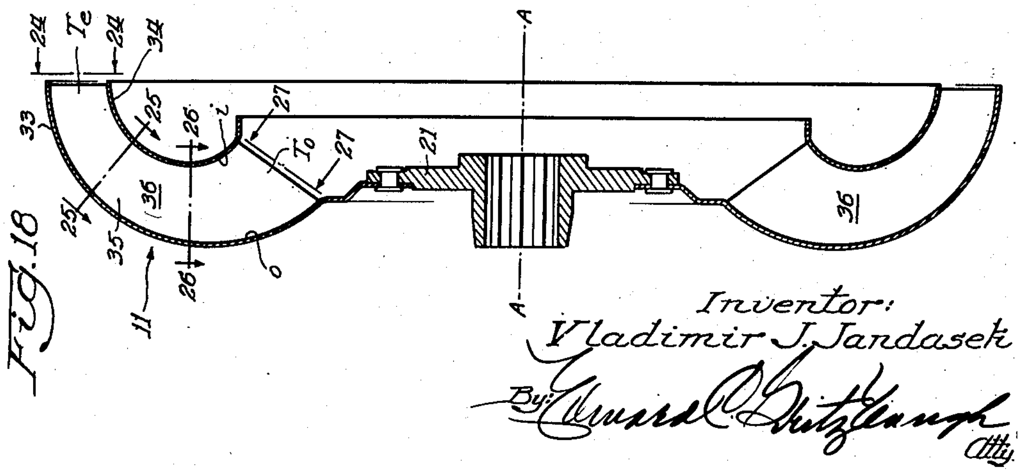
Figures 19, 20:
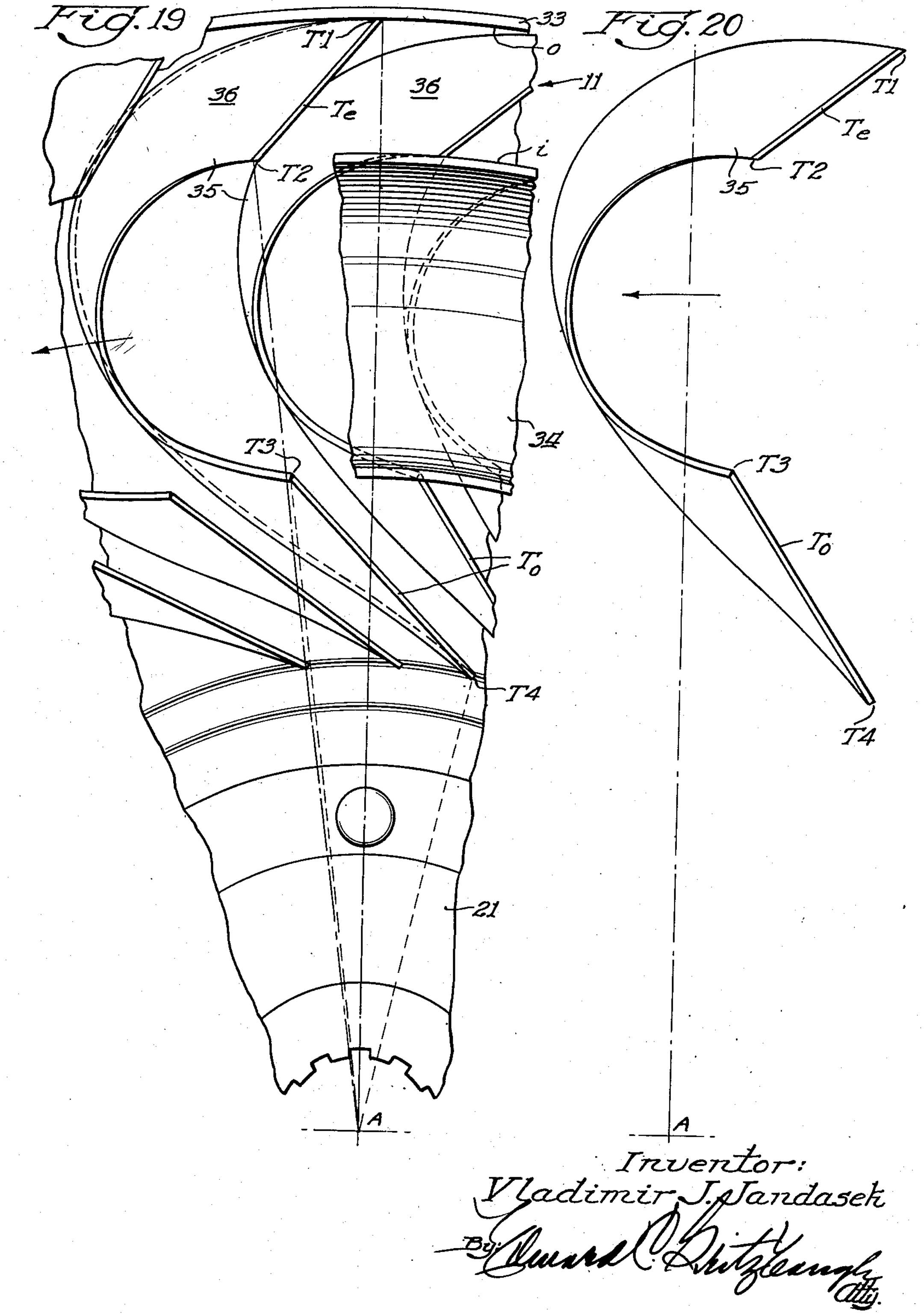
Figures 21, 22, 23:
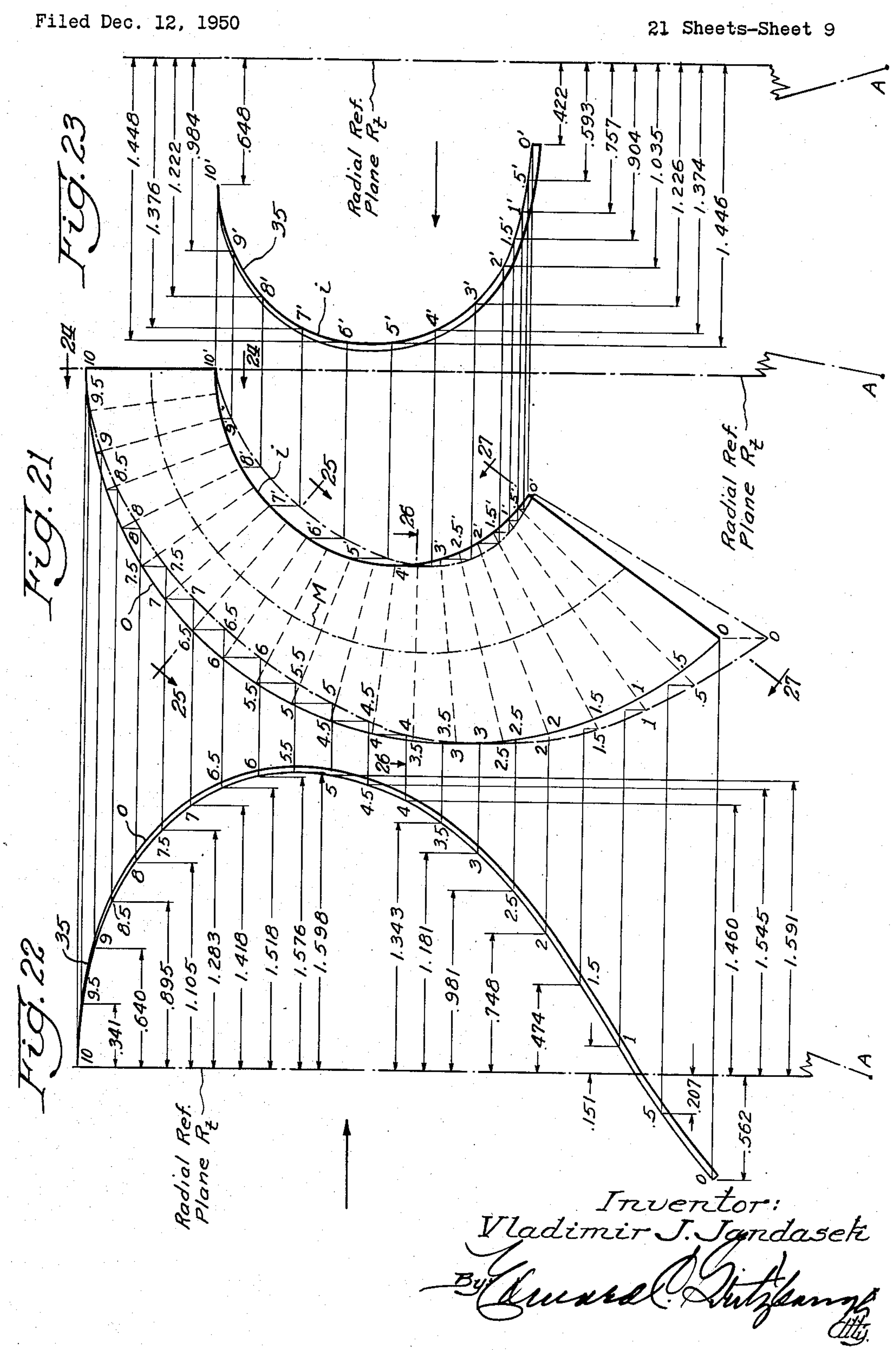
Figures 32, 33:
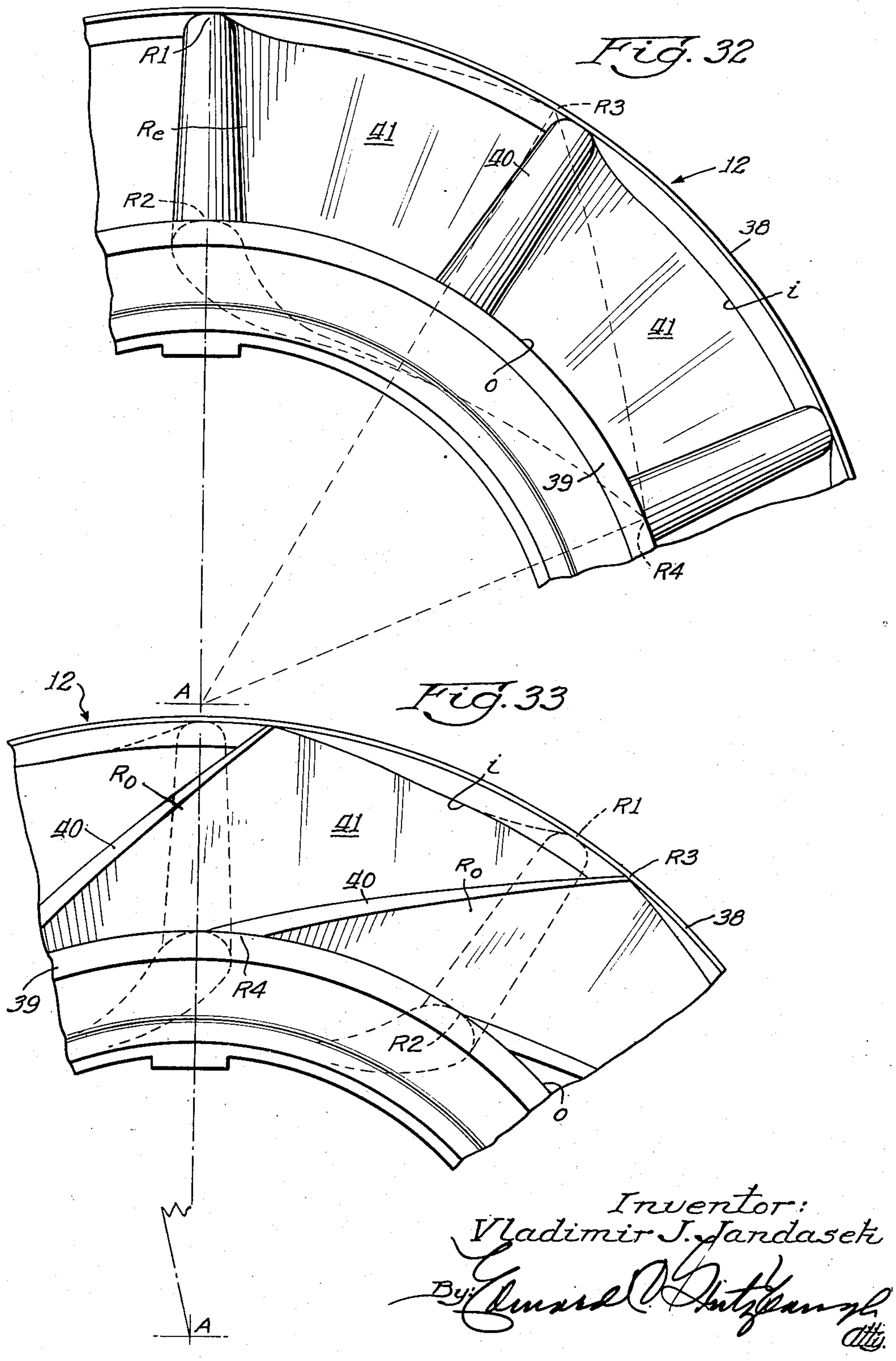
Figure 34:
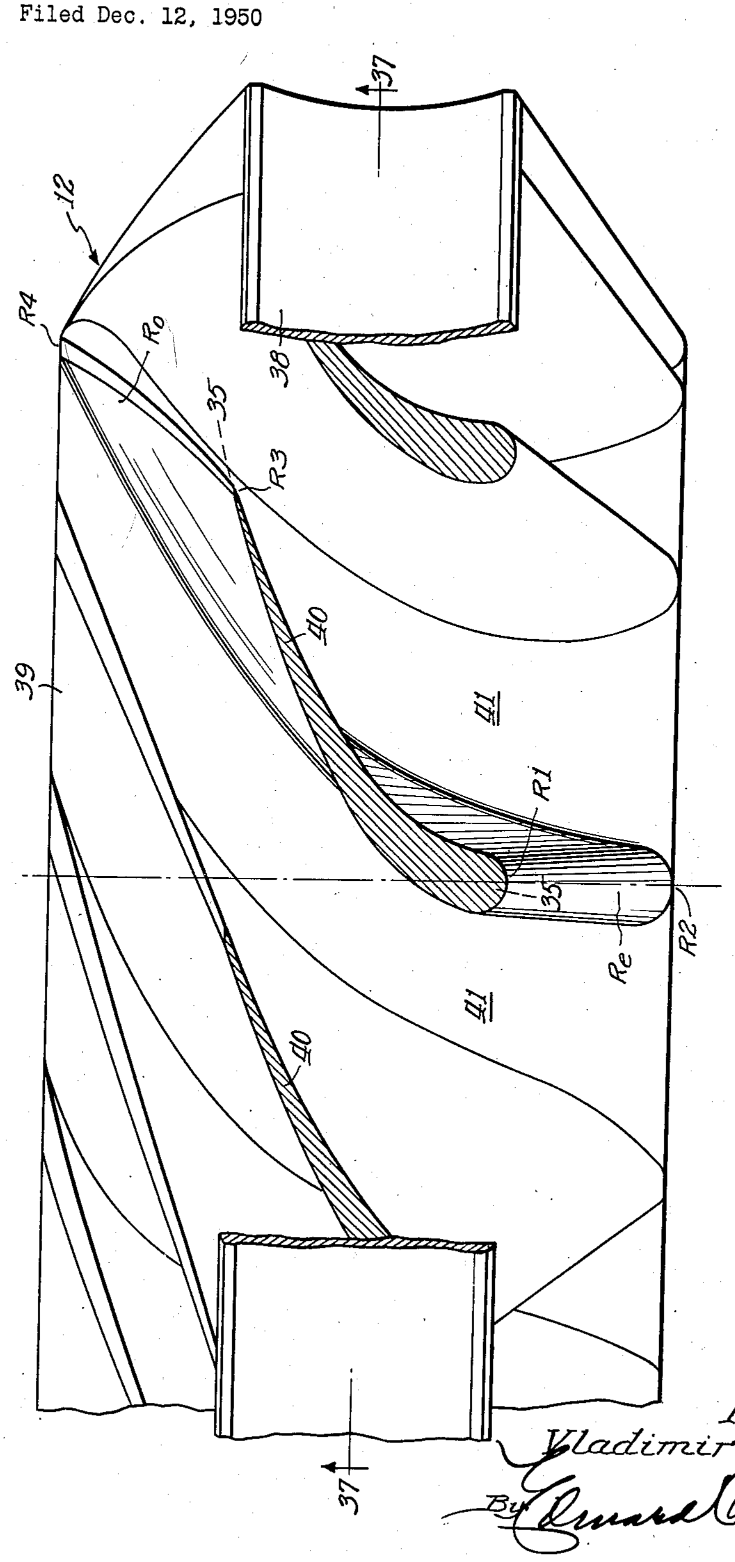
Figures 35, 36:
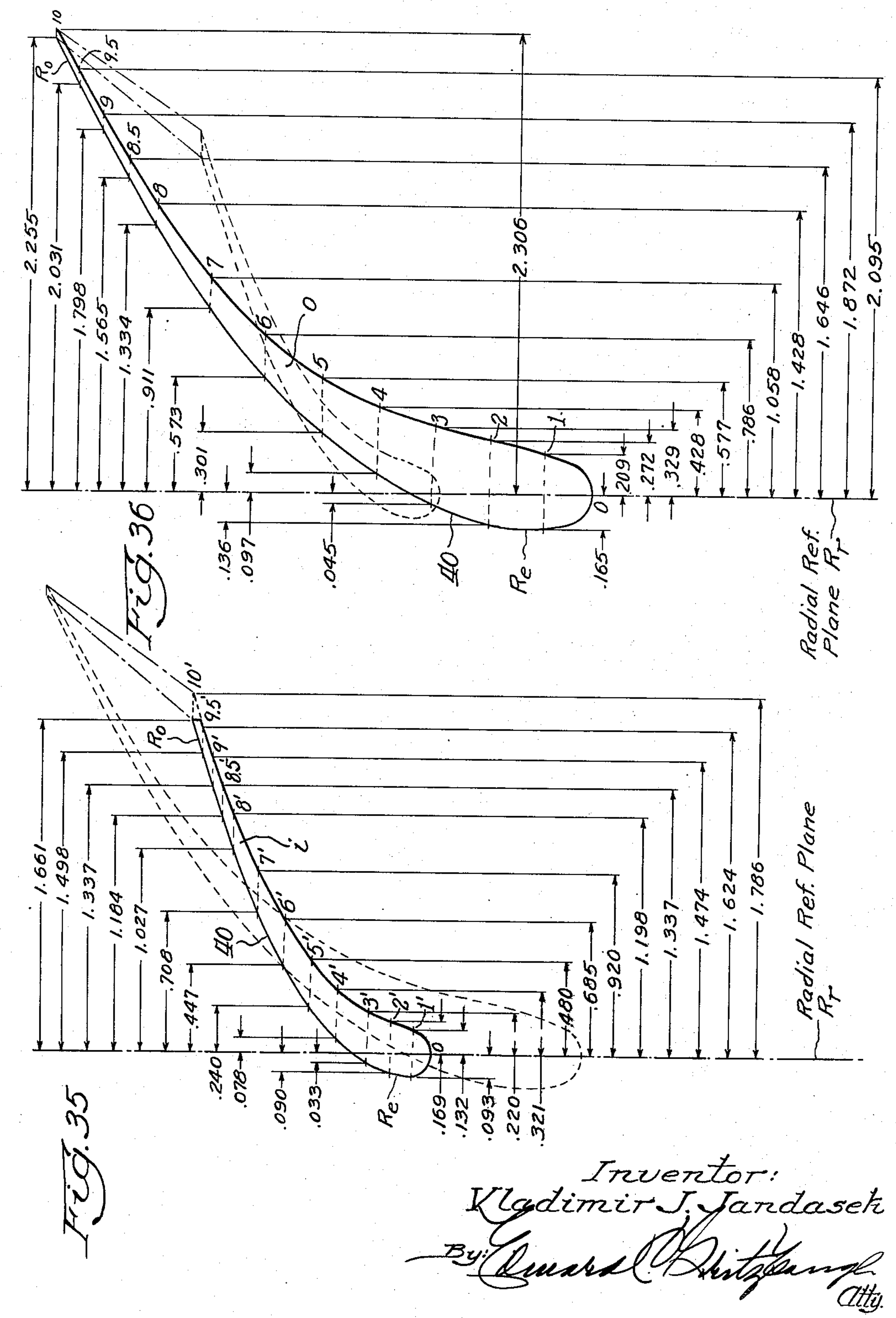
Figure 37:
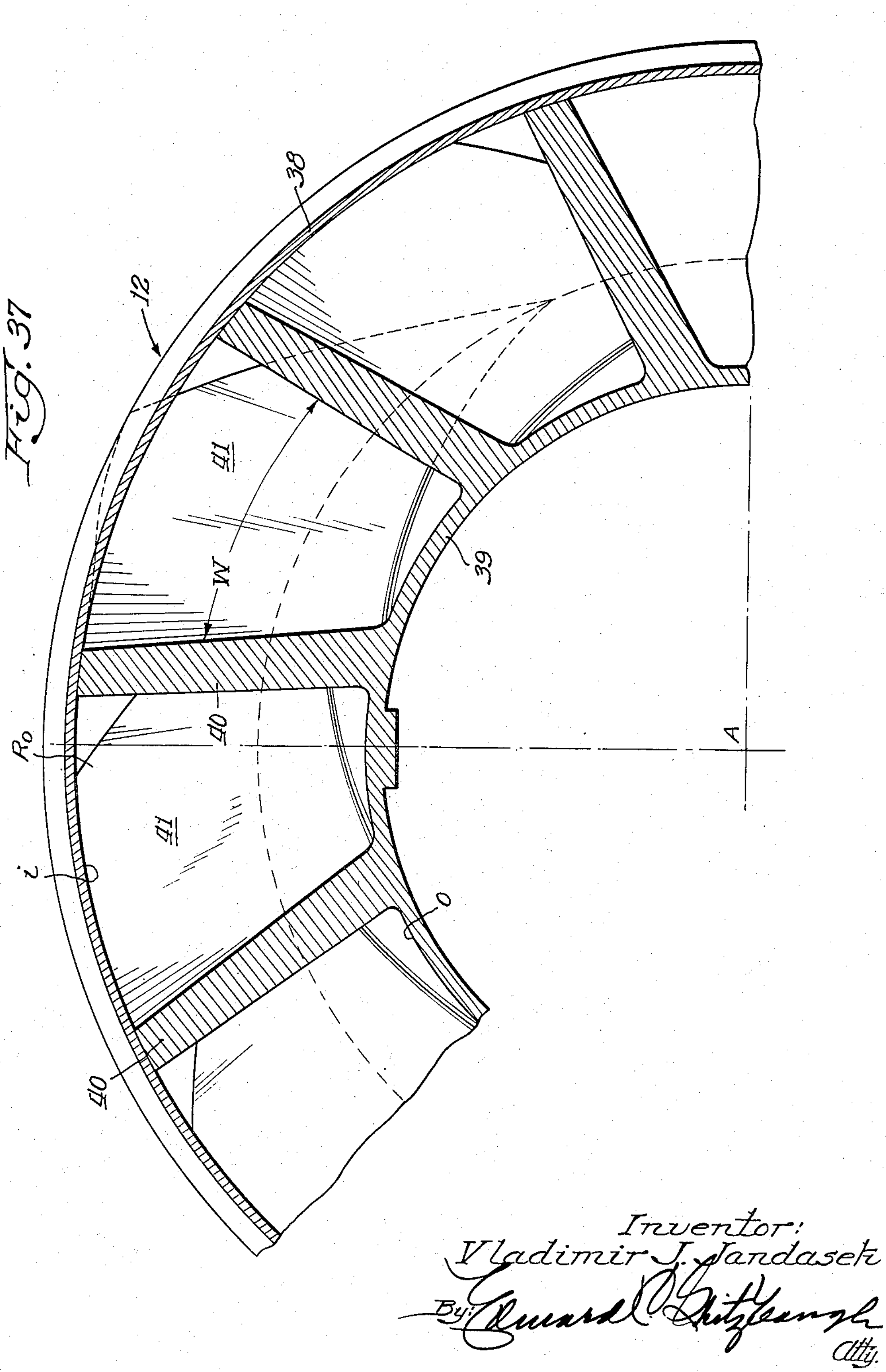
Figure 38:
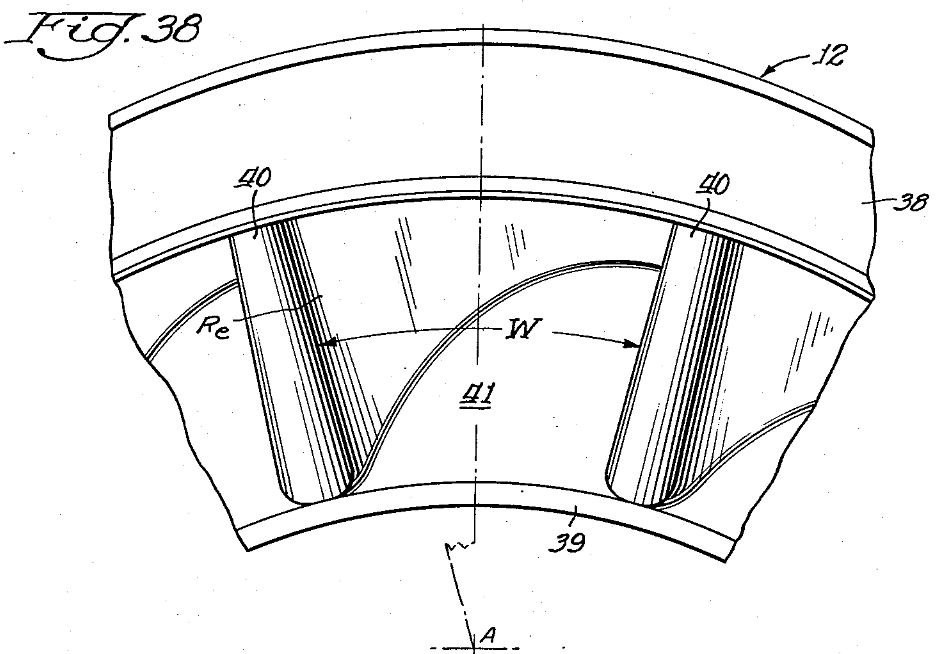
Figure 39:
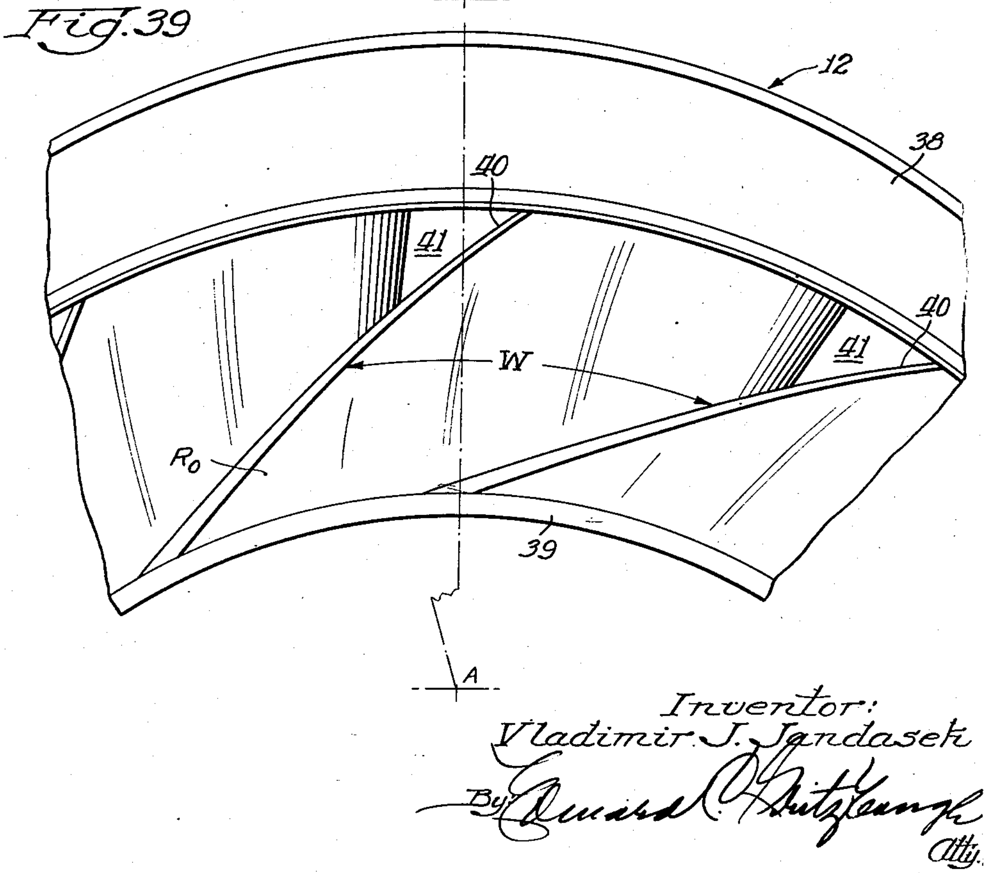
Figure 40:
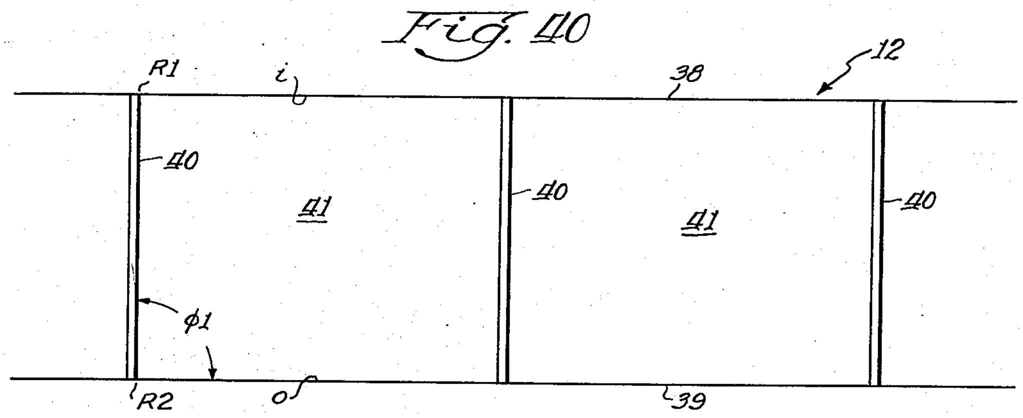
Figure 41:
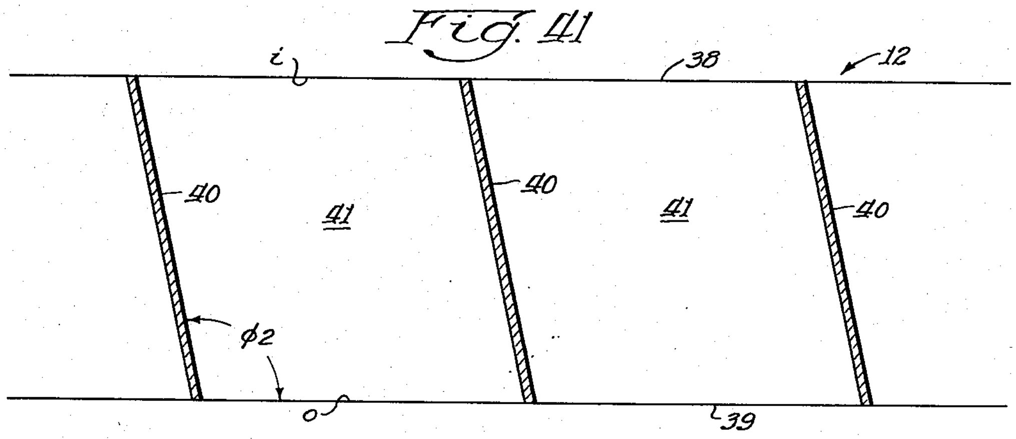
Figure 42:
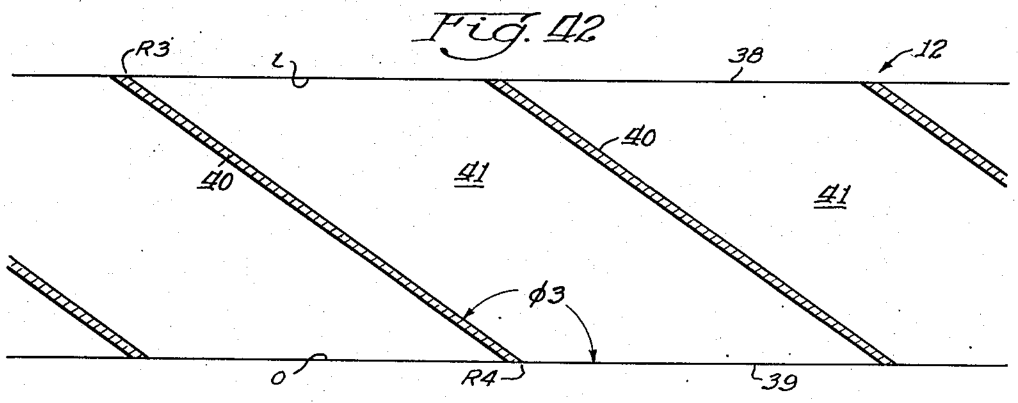
Figure 43:
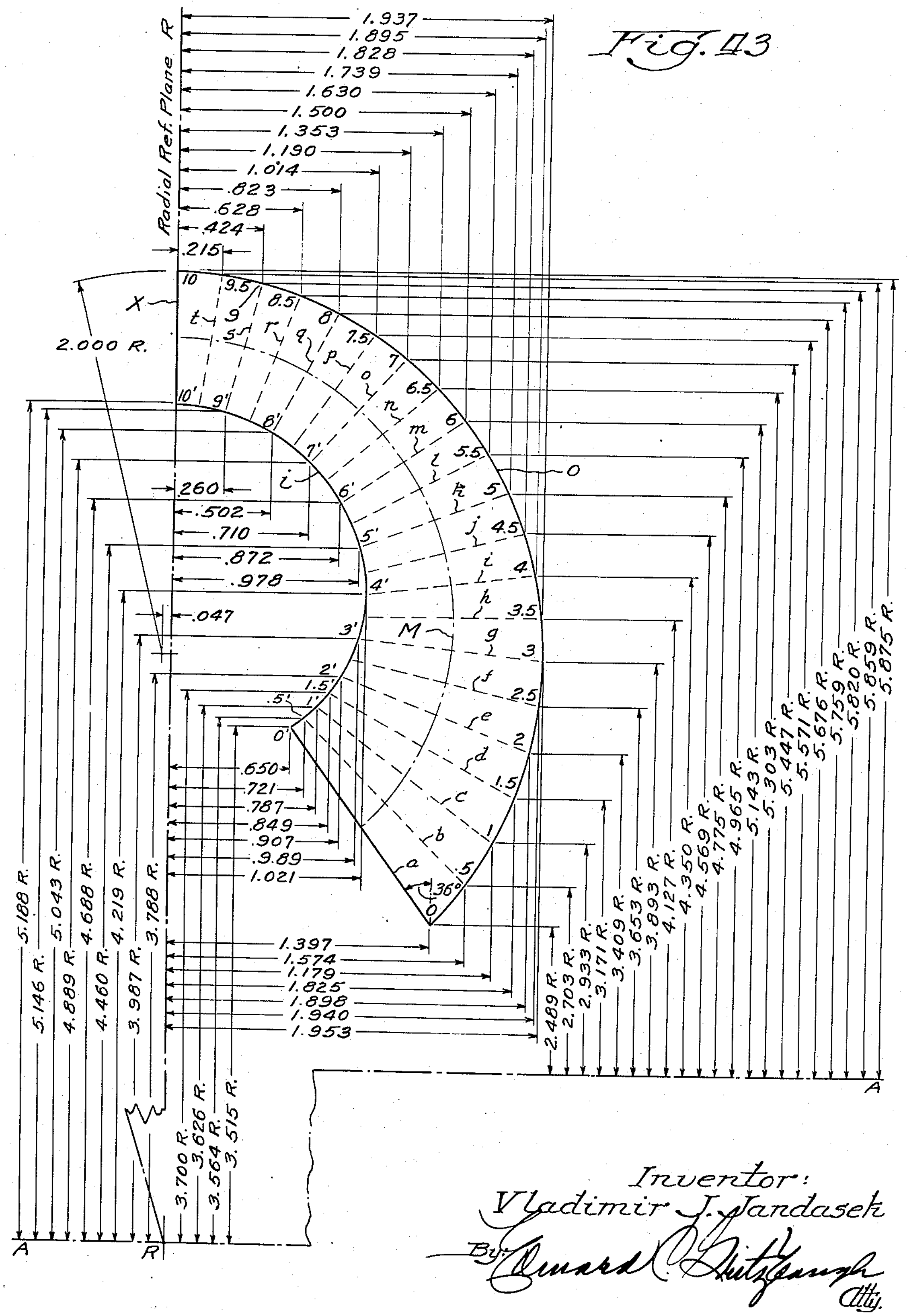
Figure 44:
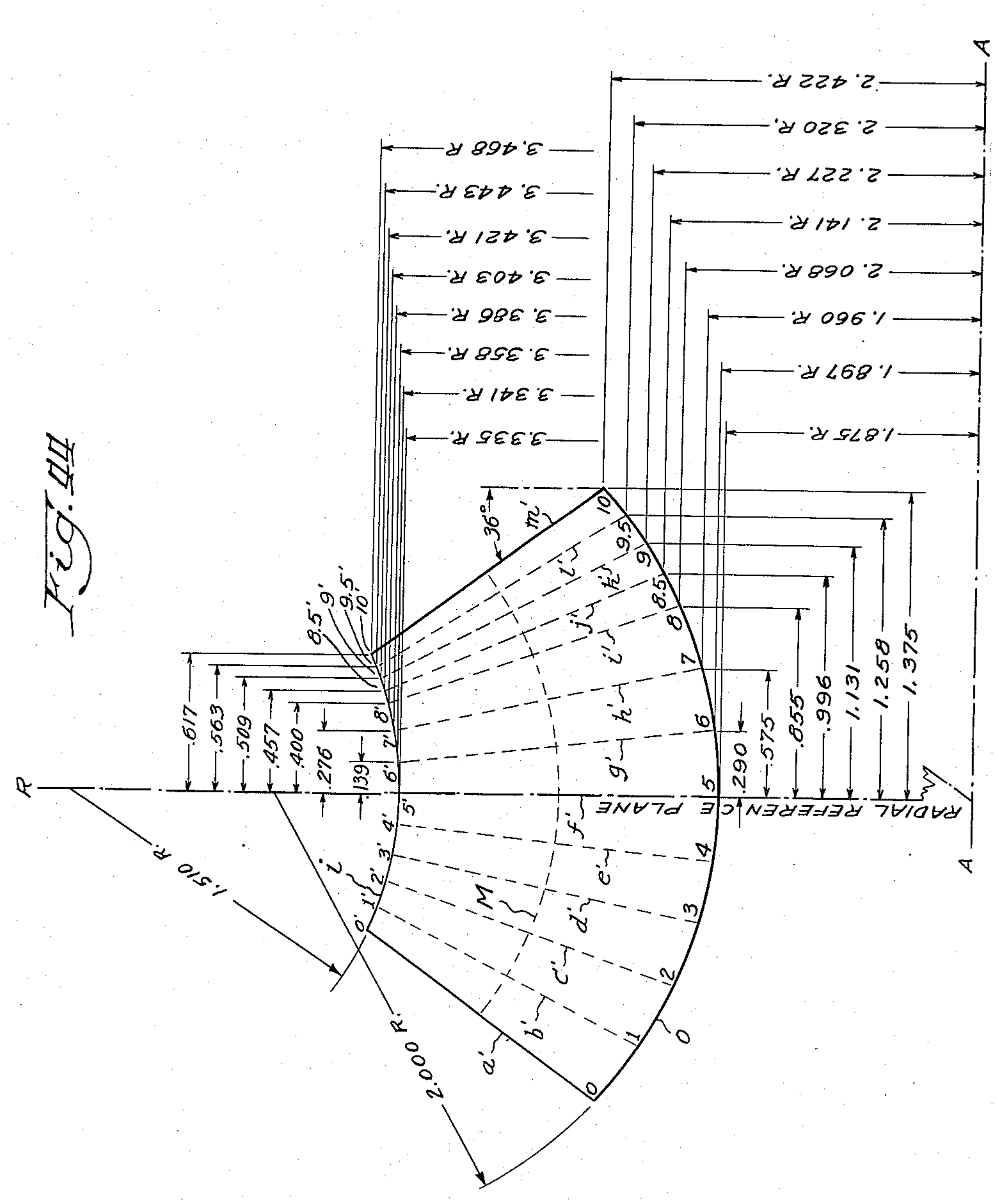
Figure 47:
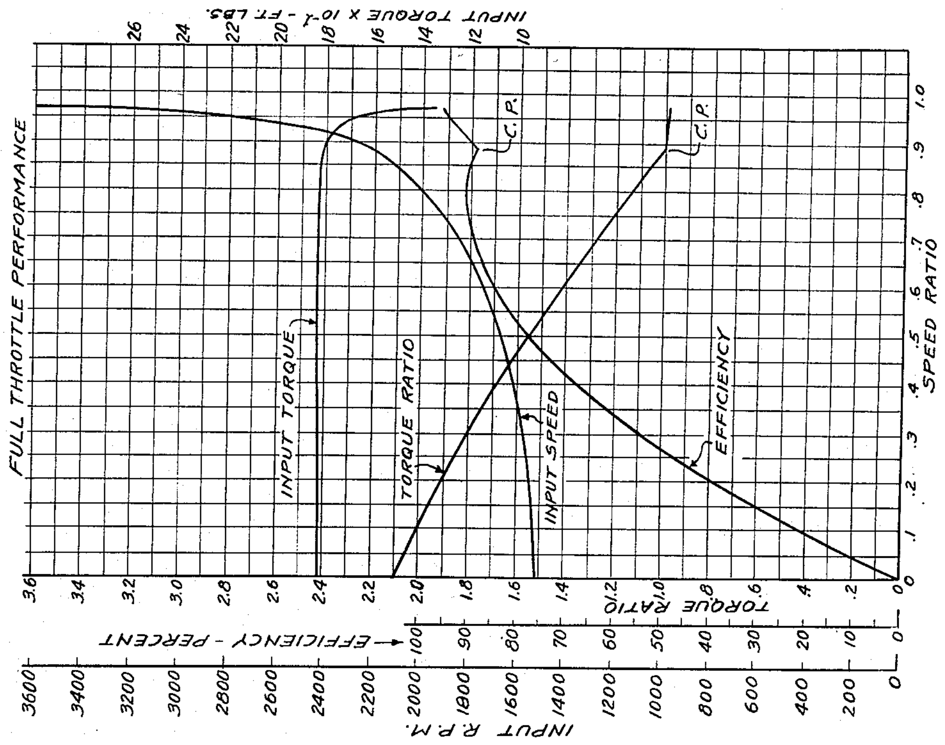
Figure 45:
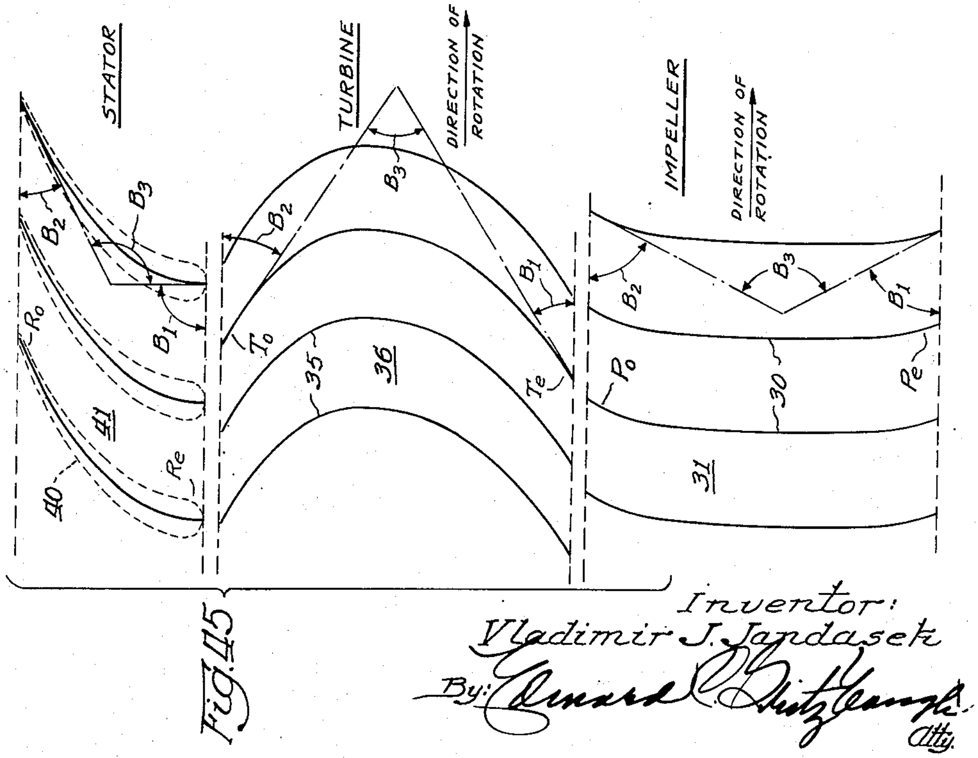
Figure 16:
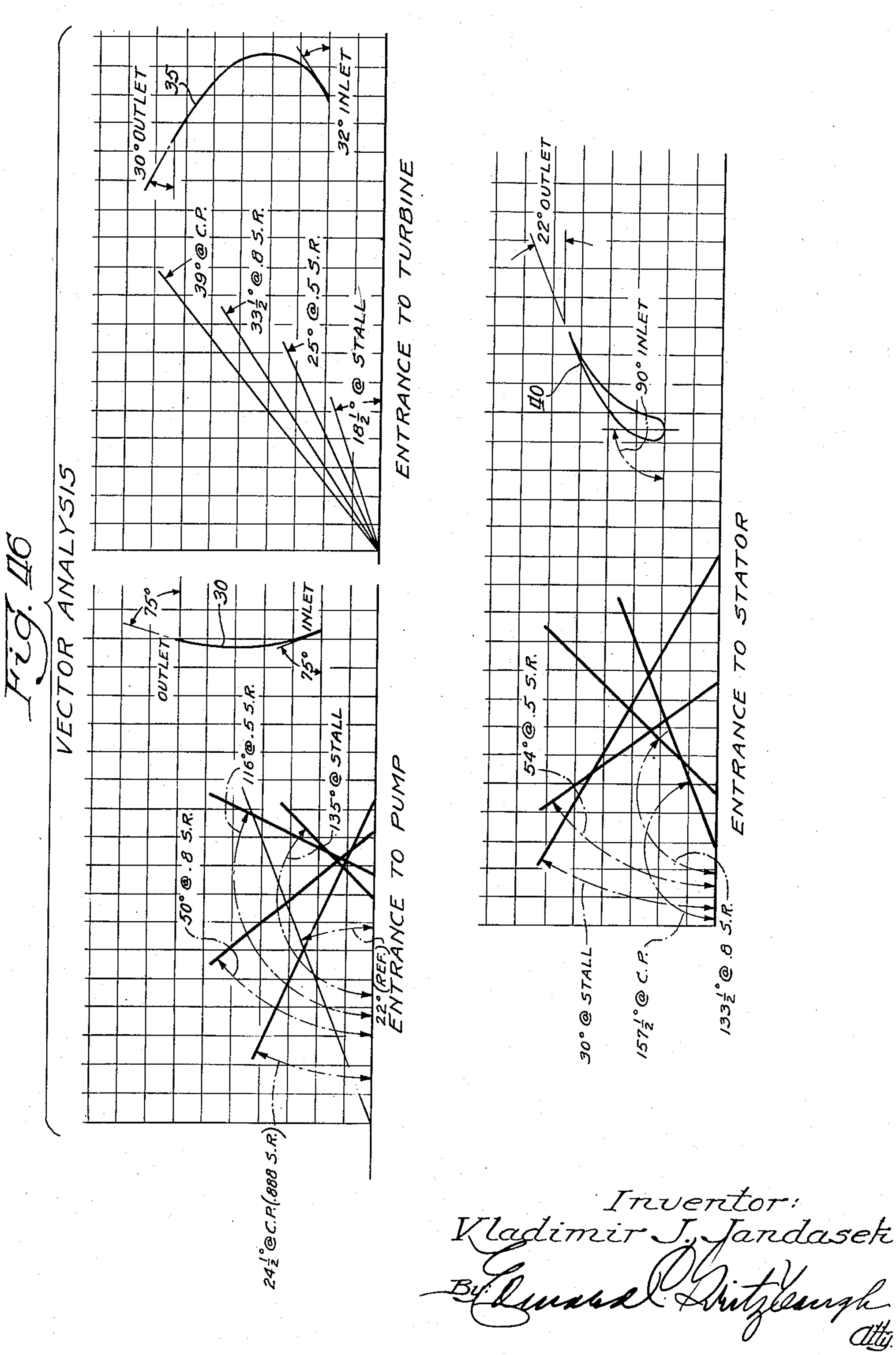
Figure 19:
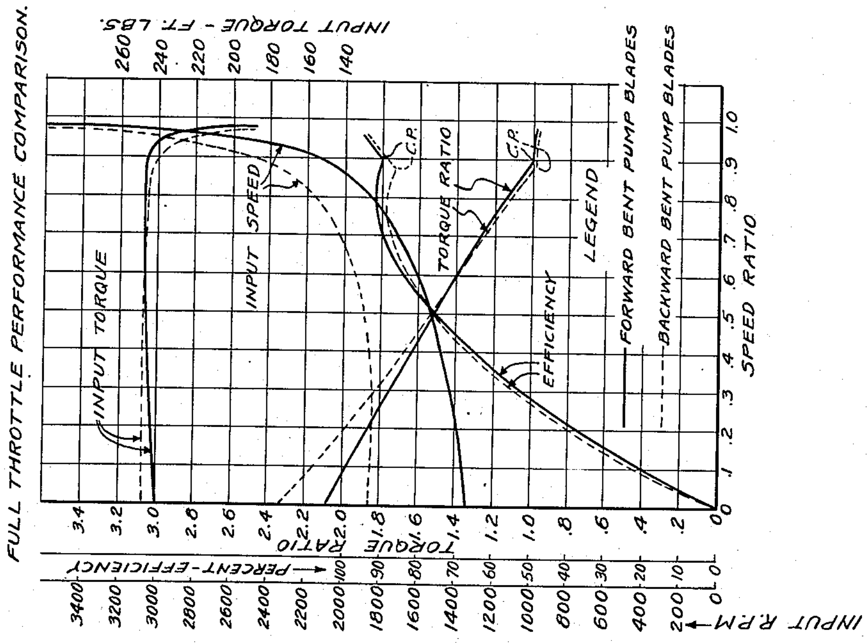
Figure 18:
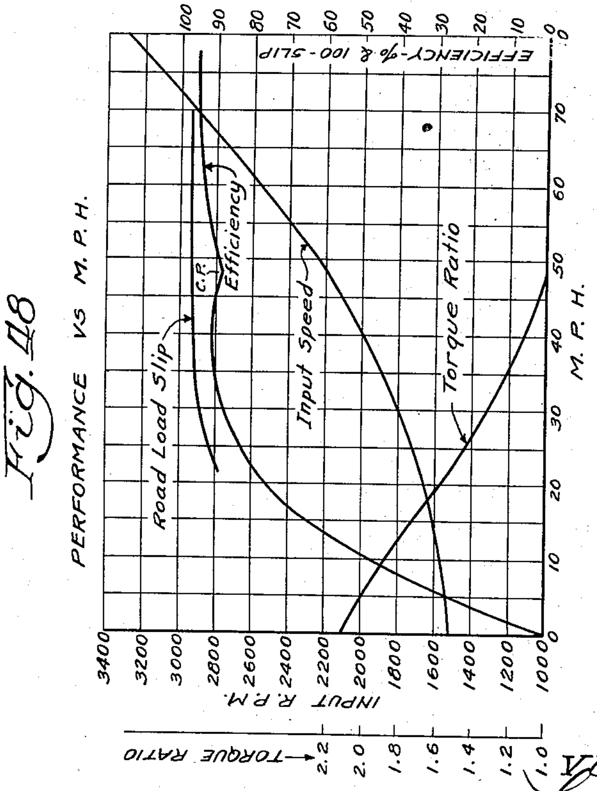

Figs. 6, 7 and 8 are different views of the pump blade shown in Fig. 5, Fig. 6 being a side elevation, Fig. 7 being a rear edge view looking in the direction of the arrow 7—7 in Fig. 6, and Fig. 8 a front edge view looking in the direction of the arrows 8—8 in Fig. 6;

Figs. 9, 10, 11, and 12 show different cross-sectional areas of one of the similar ducts formed by two blades, and the outer casing and inner shroud of the pump, said views being taken on the lines of 9—9, 10—10, 11—11, and 12—12, respectively, of Fig. 3, and as indicated on similar planes of the pump blade shown in Fig. 6;

Figs. 13, 14, 15, and 16 are diagrammatic views, based on Fig. 6 and related to Figs. 9, 10, 11, and 12, showing duct cross-sections defined in the pump between the blades and the inner and outer borders of the converter fluid circuit and particularly the angular inclinations of the blades with respect to the inner and outer borders;

Fig. 17 is an end elevation of the turbine shown in Fig. 1, said view being taken on line 17—17 of Fig. 1;

Fig. 18 is a sectional view of the turbine shown in Fig. 17, said view being taken on line 18—18 of Fig. 17;

Fig. 19 is a greatly enlarged view of a fragmentary portion of the turbine as shown in Fig. 17, certain parts being broken away to more clearly illustrate the turbine blades;

Fig. 20 is another view of one of the similar turbine blades shown in Fig. 19;

Fig. 21 is a side elevation of the turbine blade shown in Fig. 20;

Fig. 22 is a rear edge view of the turbine blade shown in Figs. 20 and 21, as seen from the left side of the blade in Figs. 20 and 21;

Fig. 23 is a front edge view of the turbine blades shown in Figs. 20 and 21, as viewed from the right side of the blade shown in Figs. 20 and 21;

Figs. 24, 25, 26, and 27 show different cross-sectional areas of similar ducts formed by the blades, outer casing and inner shroud of the turbine, said views being taken on the lines 24—24, 25—25, 26—26, and 27—27, respectively, of Fig. 18 and along similar planes indicated on the blade shown in Fig. 21;

Figs. 28, 29, 30, and 31 are diagrammatic views, based on Fig. 21 and related to Figs. 24, 25, 26, and 27, showing duct cross-sections, defined in the turbine, by the blades and the inner and outer borders of the converter fluid circuit, and particularly the angular inclinations of the blades with respect to the inner and outer borders;

Figs. 32 and 33 are side elevations of portions of the reaction member shown in Fig. 1, Fig. 32 being a view taken on line 32—32 of Fig. 1 looking in the direction of the arrows, and Fig. 33 being a view taken on line 33—33 looking in the direction of the arrows;

Fig. 34 is a top view of the reaction member as shown in Figs. 1, 32 and 33, certain parts being broken away to more clearly illustrate the blades;

Fig. 35 is a view of the top or radially outer edge of one of the blades shown in Figs. 32, 33 and 34, said view being taken on the plane generally indicated by line 35—35 of Fig. 34, the lower edge of the stator blade being shown in dotted lines;

Fig. 36 is a view of the lower or radially inner edge of the stator blade shown in Fig. 35 as viewed from the axis of the stator, the top edge of the blade being indicated in dotted lines;

Fig. 37 is a sectional view through the reaction member taken on line 37—37 of Fig. 34 to illustrate cross-sectional areas of the ducts in the central region of the blades;

Figs. 38 and 39 are views of opposite ends of the stator ducts on lines 38—38 and 39—39, respectively, of Fig. 1 and looking in the direction indicated by the arrows;

Figs. 40, 41 and 42 are diagrammatic views showing cross-sections of the ducts in the reaction member, relating to Figs. 37, 38 and 39 and illustrating the angular inclinations of the blades relative to the inner and outer borders of the converter fluid circuit;

Fig. 43 is a view showing diagrammatically a portion of the fluid circuit torus inner and outer borders defined by the outer casing and inner shroud of the pump or turbine;

Fig. 44 is a view illustrating diagrammatically a portion of the fluid circuit torus inner and outer borders defined by the outer casing and inner shroud of the reaction member;

Fig. 45 is a diagrammatic illustration of the three sets of blades of the pump, turbine and reaction member showing the blade contours along the middle streamline or at the mean flow line;

Fig. 46 is a diagrammatic vectorial presentation showing the relative fluid flow angles at stall and during different portions of the torque converting range and at the coupling point;

Fig. 47 is a graph illustrating the efficiency and torque characteristics of my converter and, more particularly, a full throttle performance curve based on a typical automotive engine plotted with respect to the converter speed ratios;

Fig. 48 is a graph of the performance of my torque converter on the basis of car miles per hour; and Fig. 49 graphically illustrates a comparison of the torque and efficiency characteristics of converters having forwardly bent and rearwardly bent pump blades.

Referring now to the drawings and first describing the mechanical structure of the hydrodynamic coupling device shown in Fig. 1, the device is of the torque-multiplying type and comprises a vaned driving element or pump 10, a vaned driven element or turbine 11, and a vaned reaction element or stator 12, the pump functioning to impart energy to a body of liquid in the torque converter, the driven or turbine element receiving energy from the liquid, and the stator being held from rotation and acting to change the direction of the flow of the liquid therethrough so that the device functions to multiply torque.

The pump 10 is connected to an engine (not shown) having a shaft 13 driven thereby and having a flange connected by bolts 14 to a drive plate 15 which, in turn, is bolted as at 16 to the pump 10 for driving the pump. A plate 17 is also bolted at 16 to the radially outer rim of the pump 10 and the plate 15 and the plate 17 serve, in combination with the pump, to provide a closed fluid chamber in which are disposed the turbine 11 and stator 12. The pump comprises a hub 18 rotatably supported on a stationary sleeve 19 fixed to a housing 20. The turbine is provided with a hub 21 splined as at 22 to a shaft 23 driven thereby. The stator 12 has a hub 24 rotatably mounted on a collar 25 splined as at 26 to the stationary sleeve 19 fixed to the housing 20, the hub of the stator having an overrunning brake 27 associated therewith to connect the stator hub 24 and the stationary collar 25 to prevent rotation of the stator in one direction during the torque multiplication stage of the torque converter, the brake overrunning to permit rotation of the stator in an opposite direction of rotation upon the impeller and runner obtaining substantially the same speed, as is well known in the art. The overrunning brake may be, as illustrated, of the sprag type, such as shown in Patent 2,408,962, issued October 8, 1946.

Referring to Figs. 1, 2, 3, and 4, the pump 10 comprises two spaced substantially semi-toroidal annular members of different diameters, one member forming a casing 28, and the other member a shroud or core ring 29 within the casing 28, the casing and shroud being connected by a plurality of blades 30 extending therebetween to provide a number of passages or ducts 31 in the pump. The blades may be secured to the casing and shroud by any suitable means as by welding. The casing 28 at its radially inner periphery is bolted as at 32 to the hub 18 of the pump.

The turbine 11, shown in Figs. 1, 17, 18, and 19, also comprises two substantially semi-toroidal annular members, one providing a casing 33 and the other a shroud or core ring 34 positioned within the casing and held in spaced relation thereto by a plurality of intervening blades 35 defining therewith passages or ducts 36 in the turbine. The blades are secured to the casing and core ring in any suitable manner, for example, welding. The casing 31 is riveted at its radially inner periphery as at 37 to the hub 21 of the turbine.

Referring to Figs. 1, 32, 33, and 34, the stator 12 is composed of two outer and inner radially spaced annular members 38 and 39, each having a concavo-convex cross-section, the radially inner member 39 being in the form of a casing connected to the collar 24. The members 38 and 39 are held in spaced relation to each other by a plurality of blades 40 having their opposite edges connected to the members 38 and 39, respectively, and defining, with the latter, passages or ducts 41 in the stator. The member 38 is commonly referred to as a shroud or core ring.

It will be apparent that the aforesaid description of the torque converter is applicable generally to torque converters having a substantially circular inner contour or border *i* (shrouds 29, 34 and 38 of the pump, turbine and stator, respectively, in Fig. 1) and the outer contour or border *o* (namely, the casings 28, 33 and 39 of the pump, turbine and stator, respectively, in Fig. 1), these walls of the casings and shrouds defining a torus chamber for the fluid vortex circuit, the outer contour *o* being related to the inner contour *i* so that the fluid circulating in the circuit always flows through an annular space of substantially the same cross-sectional area in the inner and outer borders of the circuit and anywhere therebetween; and in which the reaction member is on the smallest radius of the torque converter and the gap between the pump and turbine is on the largest radius of the torque converter.

It is claimed that optimum efficiency in hydraulic torque converters is achieved by obtaining a satisfactory acceleration of the relative flow of the working fluid within the blade ducts during operation because a retardation of the flow causes a transformation of kinetic energy into potential energy, which is invariably accompanied by losses in efficiency. To obtain the said acceleration of the relative flow of the working fluid, the blades are provided with shapes and profiles of a definite character. A further factor in sustaining velocity of the flow of the working fluid is the relationship of the adjacent exit and entrance of any two of the bladed elements at their juncture to each other to obtain smooth flow during the torque conversion stages and thus avoid (1) shock losses occurring at the entrance to a bladed element, due to the fluid discharged from one bladed element encountering the blades of the adjacent bladed element at an awkward angle which can produce turbulence and loss of velocity and consequent loss of power; and (2) fluctuation losses arising from the discharge from the center of the blade duct at a different angle from the discharge along the blade walls.

Heretofore, it has been the customary practice in designing torque converter bladed elements comprising pump, turbine and stator members to give primary consideration to the shape of the blade profiles to avoid large shock and fluctuation losses, particularly at stall to obtain maximum torque ratio, and high efficiency during the subsequent decreasing torque ratios. For this purpose, the fluid discharge portions of the pump blades and the fluid entrance portions of the turbine blades have been designed to be curved backwardly relative to the direction of rotation of their particular pump or turbine member, of which the blades are component parts, so that the fluid flows along convex pressure faces of the pump blades and is expelled from the pump duct exits into the turbine duct entrances and onto the concave pressure faces of the turbine blades for reducing such hydraulic losses in the acceleration of the relative velocity of the fluid within the pump and turbine ducts.

It has been found that, where torque converters are used in large industrial machinery in factories, ships and the like, and, accordingly, considerable latitude is had in the sizes of such converters and/or also where the power instrumentalities are electric motors, steam turbines, or engines having exceptional high horsepower ratings capable of delivering torque at high input speeds, such torque converters provide satisfactory high torque-transmitting capacity and efficiency in the torque conversion and coupling ranges. However, the use of such torque converters is impractical in passenger and truck automobiles, having internal combustion engines of 80 to 150 horsepower, and/or where the torque converters are limited in size, particularly in radial dimension, due to limited space accommodations for transmissions in such automobiles. This is due to the fact that, for a required acceptable size of such torque converter, an internal combustion engine, having a rating between 80 to 150 horsepower, having continuous high speed operation during a substantial portion of the torque-converting range of the torque converter, is not acceptable on the basis of economy, heat input, and noise level of the engine.

It is, therefore, critical to the satisfactory acceptance of the torque converter for passenger and truck automobiles that an ideal torque converter must meet the following requirements, i. e., it must be limited in its axial and radial dimensions to a size accommodatable, with the usual supplementary gearing for further torque reduction ratios and/or reverse movement of the automobile in the limited transmission space provided in the automobile and weight requirements of the transmission; and it must be capable of providing satisfactory torque ratios and high efficiency in the torque conversion range, as well as in the coupling range, at normal engine speeds, and without excessively high engine speeds in relation to a predetermined required initial torque ratio at stall and throughout the torque conversion and coupling ranges.

The torque converter of the present invention is particularly designed to provide an ideal torque converter meeting the described requirements of automobile manufacturers, and for other installations under comparable conditions.

Referring to the drawings, the direction of rotation of the pump, turbine and stator elements are indicated by arrows adjacent each element and generally describing; first, the arrangement and curvatures of the pump, turbine and reaction member blades of the torque converter, the pump blades 30 are illustrated in Figs. 2 to 16, inclusive, the turbine blades in Figs. 17 to 31, inclusive, and the stator blades in Figs. 32 to 42, inclusive. The pump and turbine blades are of stamped thin sheet metal and the reaction member blades are formed of cast metal to assume airfoil shapes.

Figure 2:
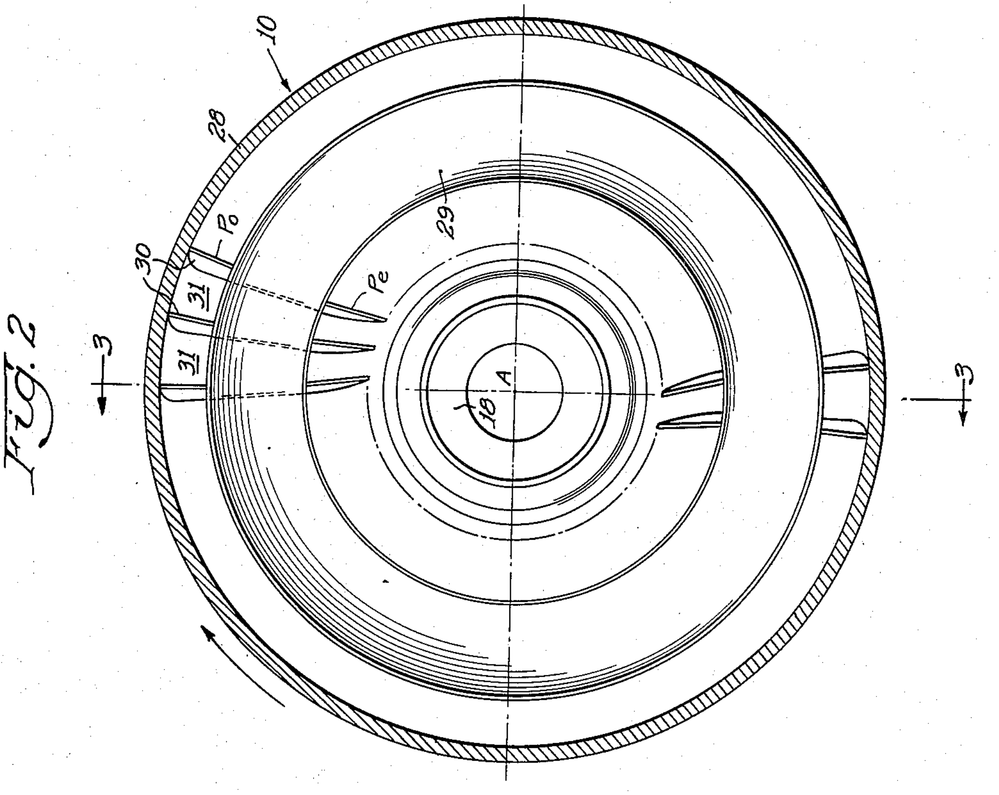
Fig. 2 is an end elevation of the pump of the torque converter shown in Fig. 1, said view being taken on line 2—2 of Fig. 1.
Figure 4:
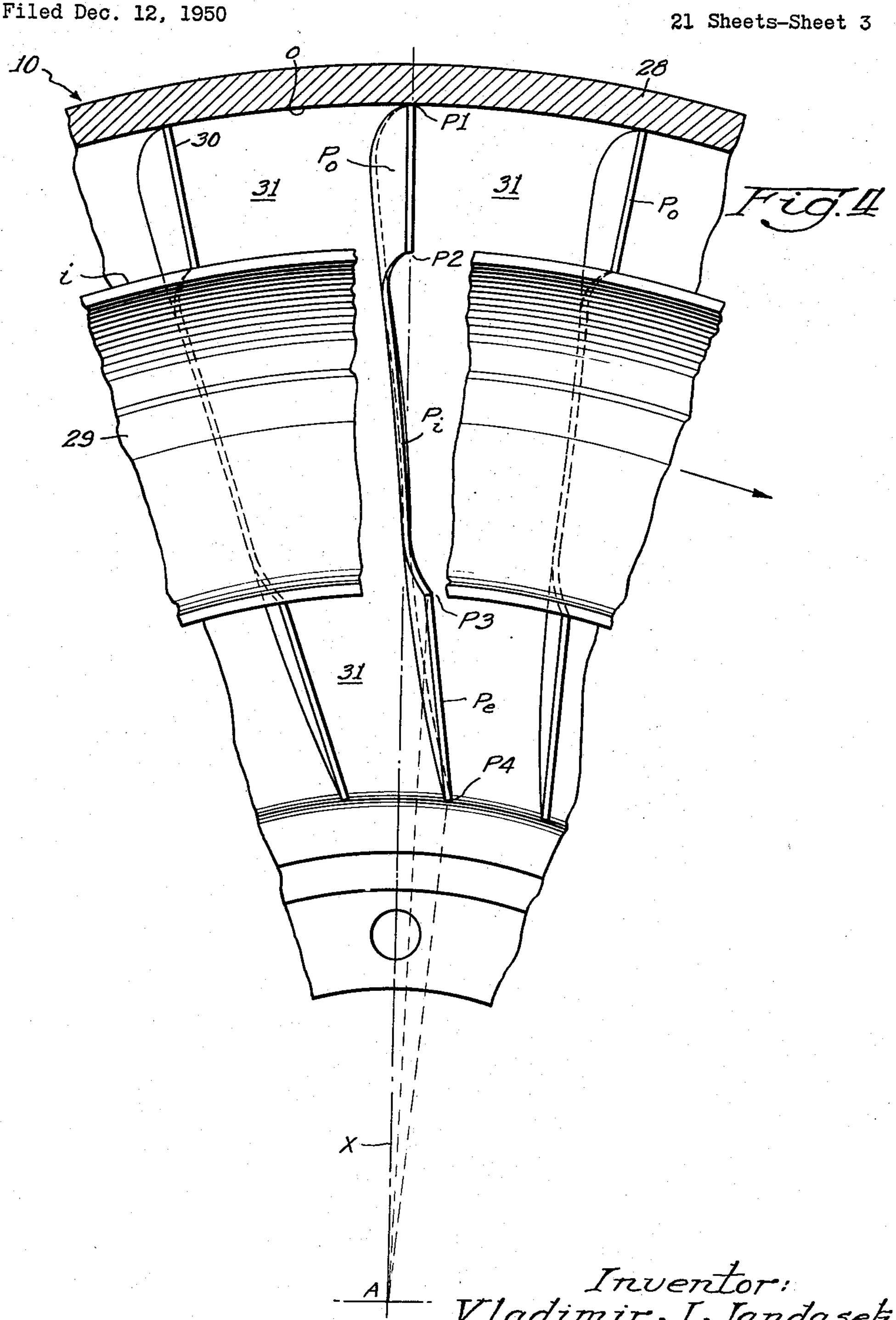
Fig. 4 is a greatly enlarged view of a fragmentary portion of the pump as shown in Fig. 2, certain parts being broken away to more clearly illustrate the pump blades.

As shown in Figs. 2 and 4, the pump blades 30 are disposed in equal circumferentially spaced relation in the casing 28 of the pump and are similarly curved or shaped to provide entrance portions $P_e$ for the fluid flowing into the ducts 31, formed by the blades 30, from the reaction member; a substantially flat intermediate portion $P_i$; and discharge or outlet portions $P_o$ for the fluid leaving the pump ducts 31 and entering the turbine ducts 36, the entrance and discharge portions being forwardly bent with respect to the direction of rotation R of the pump about its axis A of rotation which is also the axis A—A of rotation of the torque converter, and the intermediate portion $P_i$ of each blade being inclined backwardly with respect to the axis of rotation A and lying in a plane which does not pass through the axis of rotation A.

Figs. 17, 18 and 19 illustrate the similar turbine blades 35, and each blade is characterized by its exaggerated curvature substantially in the form of a parabola or hyperbola to provide entrance portions $T_e$ receiving fluid flowing into the ducts 36, formed by the blades 35, from the pump. The entrance portions $T_e$ and the exit portions $T_o$ of the blades are inclined backwardly with respect to the direction of rotation of the turbine about its axis A of rotation and the axis A—A of rotation of the torque converter.

The formation of the reaction member or stator blades is shown in Figs. 32, 33 and 34 and, referring to Fig. 34 wherein the blades are viewed radially of the axis A of the reaction member, each blade is of airfoil shape and warped helixwise, the fluid entrance portions being designated at $R_e$ and the fluid discharge or outlet portions indicated at $R_o$.

The foregoing pump, turbine and stator blades are related to control the vortex flow of fluid through the working fluid circuit in the manner shown in Fig. 45 which illustrates the flat pattern development of the blade contours at the mean flow line or path (M in Fig. 1) through the fluid passages or ducts formed between adjacent blades of the particular bladed converter element.

The relationship of the entrance and exit angles of the pump, turbine and stator blades of the present torque converter are effective to provide a torque converter of minimum size for a predetermined commercially acceptable torque ratio at stall and throughout the torque conversion and coupling ranges, and within normal operating speeds of passenger and truck automobile internal combustion engines, i. e. without excessively high engine speeds at stall or at any portion of the torque converting or coupling point range. While the pump, turbine and reaction member blade designs are correlated to provide these important advantages, an important feature is the high torque-transmitting capacity and high efficiency, particularly in the high speed ratio range of the converter, realized by the angular inclination of the pump blade discharge portions in a forward direction relative to the direction of rotation of the pump, which blade portions are effective to impart substantial velocity and thereby kinetic energy to the fluid passing through the exit ducts of the pump and into the turbine entrance ducts for absorption of the energy by the turbine.

Referring to Fig. 45 illustrating the relationship of the entrance and exit angles of the pump, turbine and stator blades at the mean blade contour, the entrance angles are designated $B_1$, the discharge or outlet angles $B_2$, and the included angles $B_3$. The included angle $B_3$, formed by tangents to the entrance and discharge edges of the blades is, according to my invention, in the range of from 40° to 80° for the turbine blades and 60° to 130° for the reaction member or stator blades and from 100° to 180° for the pump blades. The best general performance characteristics have been obtained by relating the entrance and outlet angles of the blades with respect to the blade contours at mean flow line M in Fig. 1:

| | Entrance Angles $B_1$ | Discharge Angles $B_2$ |
|---|---|---|
| Pump Blades | Between 55° to 90° | Between 45° to 90°. |
| Turbine Blades | Between 20° to 40° | Between 20° to 40°. |
| Reaction Member Blades. | Between 45° to 95° | Between 15° to 35°. |

Each entrance angle is plotted as the angle between the plane created by the entrance edges of the particular blade cascade and the contour of the blade mean line, and each of the above discharge angles is plotted as the angle between the plane created by the discharge edges of the particular blade cascade and the contour of the blade mean line, as shown in Fig. 45.

Any angle between the foregoing optimum and minimum pump blade exit angles will result in the discharge portion of the blade being bent in a forward direction relative to the direction of rotation of the pump and which is effective to discharge the fluid from the pump exit ducts into the turbine entrance ducts with considerably greater velocity in the direction of rotation of the pump than the fluid flowing into the entrance of the pump and passing through the pump ducts to the pump exits.

To more particularly illustrate the mean fluid flow through the ducts or channels of the converter, formed by the pump, turbine, and stator, the blades and the inner and outer borders $i$ and $o$ of the converter fluid circuit, attention is directed to Figs. 9, 10, 11, and 12 for the pump channels 31; Figs. 24, 25, 26 and 27 for the turbine channels; and Figs. 37, 38 and 39 for the reaction member or stator channels 41.

Figure 9:
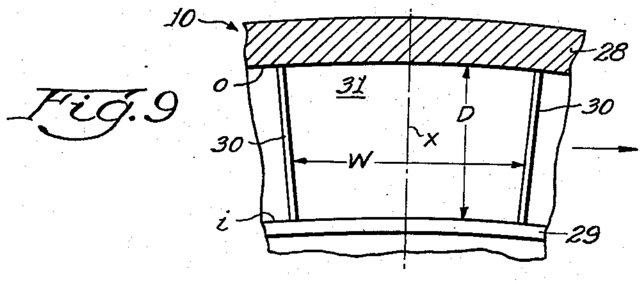
Figure 10:
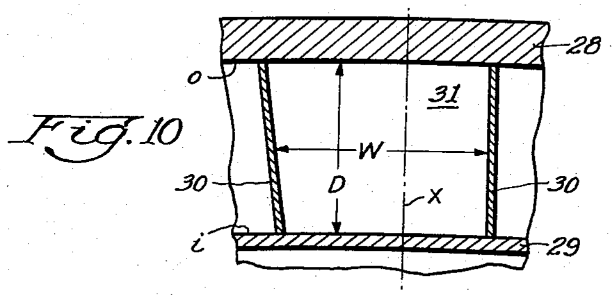
Figure 11:
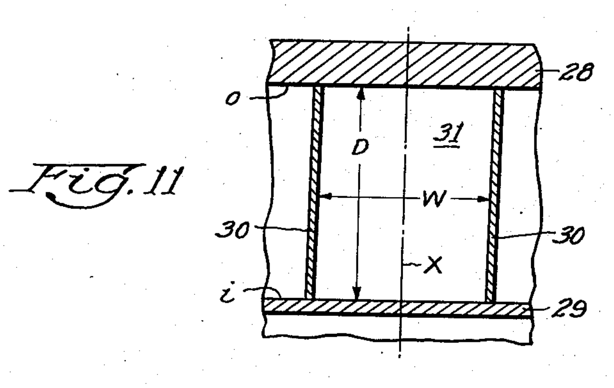
Figure 12:
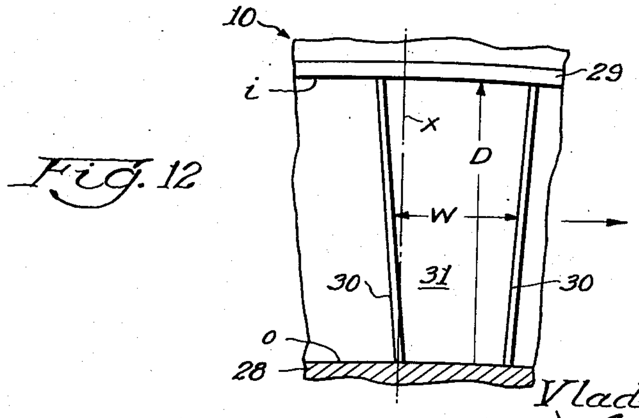

Referring first to the pump channels, Fig. 9 illustrates the exit, and Fig. 12 the entrance of one of the identical pump channels, as indicated by planes 9—9 and 12—12, respectively, of Fig. 3. Figs. 10 and 11 illustrate cross-sections of the channel between the channel exit and entrance, as indicated by the planes 10—10 and 11—11 of Fig. 3, looking in the direction indicated by the arrows.

For purposes of exactly locating the exit and entrance and also the cross-sections of the channels, reference should also be made to the side and edge views of the pump blade shown in Figs. 6, 7 and 8, the turbine blade in Figs. 21, 22 and 23, and the stator blade in Figs. 35 and 36, wherein numerically identified reference lines identify planes 0-10, and fractions thereof, indicating the respective entrance, exit and intermediate cross-sections of the pump, turbine and stator channels.

The side views of the pump and turbine blades (Figs. 6 and 21) have been illustrated in accordance with the area defined by each of the blades in the vortex circuit between the outer casing and inner shroud of the pump or turbine, or, more particularly, the outer and inner boundaries $o$ and $i$ of the circuit, as shown in Fig. 1 and as illustrated diagrammatically in Fig. 43, each turbine and pump blade occupying the same area in the circuit, when viewed in side elevation, so that the flow area shown in Fig. 43 is applicable to either the pump or turbine. The side elevation of the stator blade is also illustrated in accordance with the area defined by each of its blades in the vortex circuit between its outer casing and inner shroud, or, more particularly, the outer and inner boundaries $o$ and $i$ of the circuit as illustrated in Fig. 1 and diagrammatically in Fig. 44.

Referring to Fig. 6, the side view of the pump blade illustrates the true boundaries of the pump blade. In Fig. 21, the side view of the turbine blade, due to its exaggerated curvature, is not indicative of its true boundaries and reference should be made to the dotted lines of a blade, adjacent the solid lines of the blade, for the true boundaries of the turbine blade. These turbine blade boundaries were obtained by plotting points adjacent to the turbine blade in solid lines in Fig. 21, the points being obtained by projecting horizontal lines from the numbered points 0, .5, 1, etc. on the rear edge of the blade (Fig. 22) to, and in some cases, through the comparable edge of the blade in Fig. 21 and then projecting vertical lines from the same numerical points of the blade in Fig. 21 to intersect the horizontal lines, the intersections establishing points for connection by areas to form the true boundary of the outer blade edge. The same procedure is used in plotting the projected boundaries of the inner edges of the blade by drawing horizontal lines from numbers 0', .5', 1', etc. on the inner edge of the blade shown in Fig. 23 to intersect vertical lines drawn from the same numerical points on the inner edge of the blade shown in Fig. 21, the intersections establishing points for connection by areas to form the boundary of the inner blade edge.

The particular portions of the pump blades and the pump casing and core ring, defining the exit and entrance and cross-sections of the pump channels, are numerically identified by reference lines in the side view of the pump blade in Fig. 6 and edge views of the pump blade in Figs. 7 and 8. It will be seen that the exit end of a bladed pump duct is indicated by the view line 9—9 which is identical to reference lines 10—10' of the side and edge views of the pump blade of Figs. 6, 7 and 8, the entrance end by the view line 12—12 identical to reference line 0—0', the cross sections of the duct by the view lines 10—10 and 11—11, respectively, identical to reference lines 6.5—6.5' and 3.5—3.5'.

Referring to Figs. 9, 10, 11, and 12, the several views clearly illustrate that each of the pump channels 31 proportionately increases in width W and decreases in depth D from its entrance to its exit. As the pump blades are identical and equally spaced, it will be apparent the cross-sectional areas of the pump channels, while varying in width and depth, are equal and thereby are effective to allow the same volume of liquid to flow through each channel at its entrance and exit or at any point between the entrance and the exit of the channel.

Figure 24:
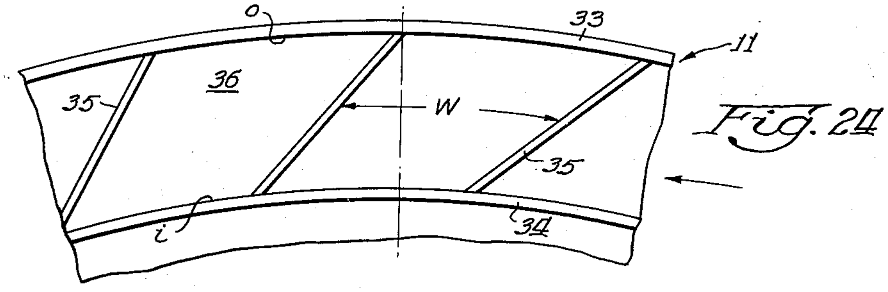
Figure 25:
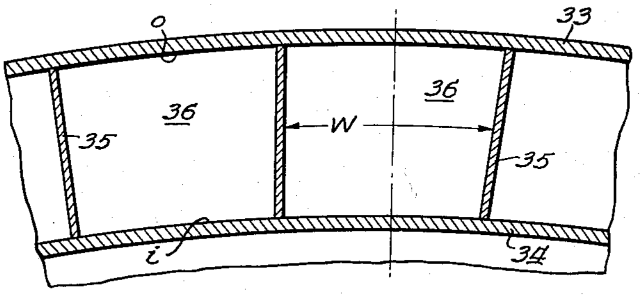
Figure 26:
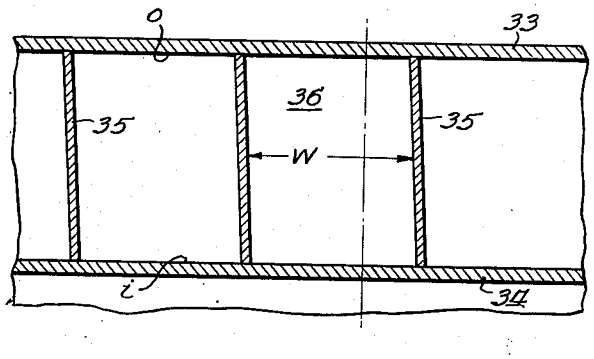
Figure 27:
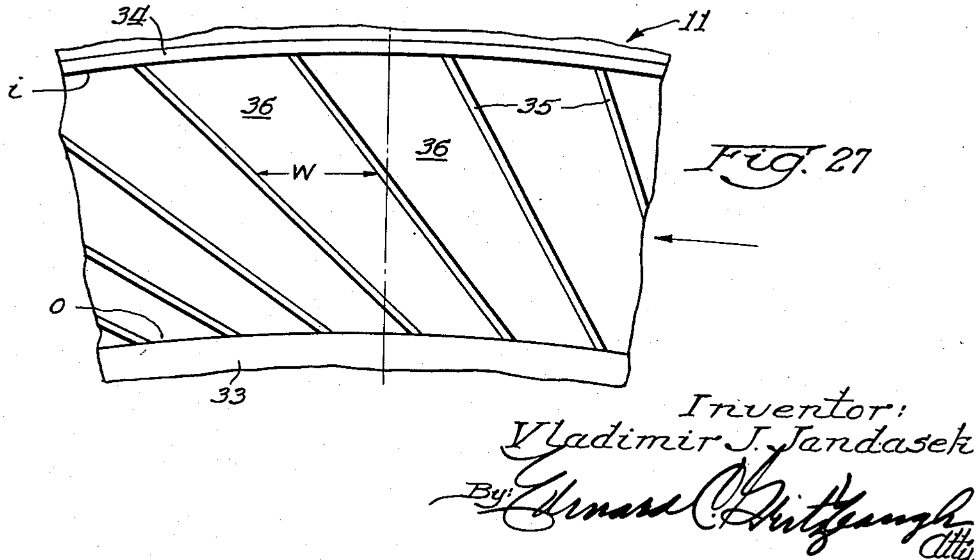

The formation of the turbine channels 35 are shown in Figs. 24, 25, 26 and 27. Figs. 24 and 27 illustrate the entrance and exit, respectively, of one of the similar bladed channels, as indicated by lines or planes 24—24 and 27—27 of Fig. 18 looking in the direction of the arrows. Figs. 25 and 26 show cross-sections of the turbine channels as viewed on lines 25—25 and 26—26 of Fig. 18. Similarly to the pump blades, reference area-dividing lines 0 to 10, and fractions thereof, are provided on the turbine blades, shown in Figs. 21, 22 and 23, to locate exactly the entrance and exit, and also the cross-sectional views, of the channel on the blades. The side view of the blade in Fig. 21 illustrates that the channel exit shown in Fig. 27 is taken on reference line 0—0′ of the edge views of the blades in Figs. 22 and 23, the line 0—0′ of the edge views of the blades in Figs. 22 and 23, the line 0—0′ being identical with section line 27—27, that the channel entrance shown in Fig. 24 is taken on reference line 10—10′ of the edge views of the blades in Figs. 22 and 23, the line 10—10′ being identical with section line 24—24; and the cross-sections of the blade channel shown in Figs. 25 and 26 are taken respectively on reference lines 6.5—6.5′ and 3.5—3.5′ of the blade as indicated in Figs. 21, 22 and 23. An inspection of Figs. 24–27 discloses that the blades are curved backwardly to the rotation of the turbine at their entrance and gradually curving backwardly relative to the direction of rotation of the turbine between their entrances and exits and at their exits as clearly seen from Figs. 19, and 24–27, in order to make use of the available fluid energy received from the pump and to absorb the kinetic energy of the fluid. Each of the turbine channels decreases in width W while increasing in depth from their entrance to their exit in a manner such that the cross-sectional areas of the turbine channels allow the same volume of liquid to flow through each channel, these areas at the exit and entrance and sections therebetween being equal.

The channels 41 in the reaction member are illustrated in Figs. 34, 37, 38, and 39, the entrance of a channel being shown in Fig. 38 and as viewed from the line 38—38 in Fig. 1, the exit of the channel in Fig. 39 and as viewed from the line 39—39 in Fig. 1, and the section of the channel intermediate the entrance and exit in Fig. 37 being taken on the plane indicated by 37—37 in Fig. 34. From an inspection of these figures and Fig. 45, it will be apparent that the blades define channels, with each channel designed to converge in width W from the entrance of the channel to the exit of the channel in a manner relative to the depth of the channel to provide channels of equal flow area. The blades are shown inclined in the direction of rotation of the turbine and the pump, the entrance portions of the stator blades being curved reversely to the curvature of the turbine blade exit portions whereby the fluid leaving the turbine has its direction changed by the stator blades for entrance into the pump.

The side and edge views of the various blades, shown divided into areas by the planes 0—10, and fractions thereof, have a further function for exactly locating the distance of the particularly indicated blade portions to a radial reference line extending from a point on the axis A—A of the converter and through the blade. This will be further explained hereinafter in the description of the blades for a torque converter of a particular size.

The annular shapes of the converter profile, defined by the previously structurally defined inner and outer borders *i* and *o* of the converter bladed elements (Figs. 1, 4, 19, and 37) must be given consideration in the design of the blade curvatures to equalize the velocity distribution between the outer and inner borders as much as possible for, if the blades are not designed properly, the circulation at the inner border *i* may be higher than at the outer border *o* which is detrimental to the behavior of individual portions of the total flow. While the mean flow of fluid by the blades determines the kinetic energy transfer, the annular profile shape introduces deviation below and above the average or mean flow properties of each bladed element, due to the velocity differences at the inner and outer borders.

The blades of the pump, turbine and stator of the present converter have been designed that the fluid velocities within each of these bladed elements are substantially even, with consequent smooth and efficient flow of the fluid through the individual bladed elements. Fig. 1, Fig. 4, Fig. 19, Figs. 32–34, Figs. 13–16, Figs. 28–31, and Figs. 40–42 illustrate the particular design and relationship of the blades of the turbine, pump, and reaction member relative to the outer and inner borders of the converter circuit providing this important and advantageous feature. In the figures, the outer border of the fluid circuit of the converter is designated *o*, and the inner border is indicated at *i*.

Referring to Figs. 1 and 4, and 13 to 16, the pump blades are bounded by the points P1, P2, P3, P4; P3 and P4 defining the entrance edge and P1 and P2 defining the exit edge. The entrance edge has its inner tip P3 on the inner border *i* and its outer tip P4 on the outer border *o*, the outer tip P4 lying in front of the inner tip P3 in relation to the direction of rotation of the pump. The exit edge has its inner tip P2 on the inner border *i* and its outer tip P1 on the outer border *o* disposed substantially in a common radial plane. Referring to Figs. 1 and 19, and 28–31, the entrance and exit edges of each turbine blade is bounded by the points T1, T2, T3 and T4. The entrance edge has its outer tip T1 lying behind the inner tip T2 in relation to the direction of rotation of the turbine, and the exit edge has its inner tip T3 lying ahead of its outer tip T4 in relation to the direction of rotation of the turbine. Referring to Figs. 1, 32–34, and 40–42, the entrance and exit edges of each reaction member blade 45 is bounded by the four points R1, R2, R3, and R4, R1 and R2 defining the entrance edge and R3 and R4 the exit edge. The entrance edge has its outer tip R2 and its inner tip R1 in a substantially common radial plane, and the exit edge has its outer tip R4 lying behind the inner tip R3 in relation to the direction of rotation of the pump. The curvature of the blades to provide the relationship of the aforesaid outer and inner tips of each of the pump, turbine and reaction member blade exit and entrance edges is effective to equalize the velocity distribution between the inner and outer borders in each of the bladed elements.

Figs. 13 to 16, inclusive, are diagrammatic views related to Figs. 9 to 12, respectively, and taken in the same planes 10—10′, 6.5—6.5′, 3.5—3.5′, 0—0′ and as also indicated in Fig. 6 to illustrate the angular relationship of the pump blades to the outer and inner borders or contour walls *o* and *i*, defining the pump torus portion of the converter, the particularly designated cross-sections of the pump being unwrapped to dispose the inner and outer borders in parallel planes with the blades assuming resultant angular positions. Figs. 13–16, while somewhat comparable to the cross-sections of Figs. 9–12, are effective to clearly illustrate the aforesaid angles of the pressure faces of the pump blades with respect to the inner and outer borders *i* and *o*, which feature cannot be determined in Figs. 9–12 due to the curvature of the inner and outer borders of the pump torus and disposition of the blades with respect thereto. It will be seen from an inspection of Figs. 13–16 that each pump duct entrance in Fig. 16 (10—10′ in Fig. 6) is of non-rectangular parallelogram form, with the pressure face of the particular section of each blade forming an angle $\alpha_1$ greater than 90° with the outer contour wall *o*; that each duct cross-section in Fig. 15, taken on line 3.5—3.5′ of the blade in Fig. 6 and of the actual cross-section shown in Fig. 11, is of rectangular form with the pressure face of the particular section of each blade forming an angle $\alpha_2$ of substantially 90° with the outer contour wall *o*; that each duct cross-section of Fig. 14, taken on line 6.5—6.5′ of the blade in Fig. 6 and of the actual cross-section shown in Fig. 10, is of non-rectangular parallelogram form with the pressure face of the particular section of each blade forming an angle $\alpha_3$ of less than 90° with the outer contour wall *o*; and that each duct exit of Fig. 13 (10—10′ of Fig. 6) and of the actual cross-section shown in Fig. 9 is of rectangular form with the pressure face of the particular section of each blade forming an angle $\alpha_4$ of substantially 90° with the outer contour wall *o*.

Figs. 28 to 31, inclusive, are diagrammatic views of portions of the turbine and are related to Figs. 24 to 27, inclusive, and taken in the planes 10—10′, 6.5—6.5′, 3.5—3.5′, and 0—0′ of Figs. 21, 22 and 23 to illustrate the angular relationship of the turbine blades to the outer and inner borders *o* and *i* defining the turbine torus portion of the converter, the particularly designated cross-sections of the turbine being unwrapped to dispose the inner and outer borders in parallel planes with the blades assuming angular position parallel to each other in each view as a condition of the unwrapping action. It will be apparent the aforesaid angular relationship of the blades cannot be determined from an inspection of Figs. 24–27 due to the curvature of the inner and outer borders of the converter circuit. Referring to Figs. 28 to 31, all of the various duct cross-sectional areas defined by different portions of the blades and the inner and outer borders *i* and *o* are of non-rectangular parallelogram form, the pressure faces of the edges of the blades at each duct entrance shown in Fig. 28 forming an angle $\Delta_1$ greater than 90° with the outer contour wall *o*; the pressure faces of the portion of the blades (Figs. 29 and 30) intermediate the duct entrance (Fig. 28) and the duct exit (Fig. 31) forming angles $\Delta_2$ and $\Delta_3$ of less than 90°, and the pressure faces of the edges of the blades at each duct exit (Fig. 31), forming an angle $\Delta_4$ greater than 90° with the outer contour wall *o*.

Figs. 40, 41, and 42 are also diagrammatic views related to Figs. 32, 37, and 33, respectively, and illustrate, in unwrapped form of the reaction member torus, the angular relationship of the reaction member blades to the outer and inner borders *o* and *i* defining the reaction member torus portion of the converter. Fig. 40 is related to Fig. 32 with respect to the cross-sectional area of each duct entrance, Fig. 41 to Fig. 37 with respect to the cross-sectional area of the portion of the duct intermediate the duct entrance and exit, and Fig. 42 to Fig. 33 with respect to the cross-sectional area of each duct exit. As seen in Fig. 40, the duct entrance cross-section, defined by the entrance edge portions of the blades and the outer and inner torus borders *o* and *i*, is in the form of a parallelogram, with the pressure face of each blade forming an angle $\phi_1$ of 90° with the outer contour wall. Figs. 41 and 42, respectively, illustrate that the cross-section of the duct (Fig. 41) intermediate the entrance and exit of the duct, and the duct exit (Fig. 42) are of non-rectangular parallelogram form with each of the pressure faces of the blades forming an angle greater than 90° with the outer contour wall.

It is well known that one of the hydraulic losses resulting in decreasing the fluid velocity in the operation of a torque converter is attributable to the skin friction between the fluid and metal surfaces, and, accordingly, a factor controlling the velocity of the fluid is the number of blades used in the converter. As the higher the velocity of the fluid, the greater the torque capacity and efficiency of the converter, it is desirable that the number of blades be reduced as much as possible to minimize this hydraulic friction loss. For this purpose, the number of pump blades may be between 25 and 35, the turbine blades between 25 and 35, and the reaction member blades between 9 and 15.

Having now generally described the torque converter of the present invention, a specific example of my torque converter having the various features hereinbefore referred to will now be described.

Present requirements of automotive manufacturers, prescribed by the limited space accommodations for transmissions in passenger and truck automobiles, necessitate acceptable hydraulic torque converters to be designed with minimum diametrical dimensions. One generally satisfactory diametrical dimension for a torque converter is eleven and three-quarters inches (11¾″), and a torque converter of this size and including the several features of my torque converter described has been manufactured in productien quantities for use in passenger automobiles.

This production torque converter, having the stated size, is identical to the assembly shown in Fig. 1; its component parts are shown in Figs. 2–43, inclusive; the flat pattern development of the blade contours at the mean flow line as shown in Fig. 45; the vector analysis of the angles of fluid flow at different stages of operation of the converter are shown in Fig. 46; and the graphs, identified by Figs. 47 and 48, illustrate the torque and efficiency characteristic of the torque converter.

The general characteristics of the blade design of the torque converter have been previously described and, accordingly, will be assumed to be present in the torque converter, reference being hereinafter made to such described features, when required, and to dimensions of the various parts given in the drawings or in this description, for illustrating the manufacturing specifications of the torque converter to those skilled in the art, together with the blade design for controlling and directing the fluid to obtain the desired torque conversion stages and coupling stage of the torque converter.

In the design of the torque converter, the pump and turbine semi-toroidal casings 28 and 33 are provided with identical internal diameters intersecting the axis A—A of the converter and having their radially arcuate inner surfaces, at any section of either casing, having a common center, when assembled, as shown in Fig. 1. The pump and turbine semi-toroidal core rings are formed identical in every respect and their outer arcuate surfaces are located eccentrically with respect to the common center of the arcuate inner surfaces of the casings. Accordingly, the portions of the torus providing the vortex circuit and defined by the pump and turbine casings and core rings, are identical and, for this reason, reference can be made to Fig. 43 illustrating one of these portions of the vortex circuit and providing the various dimensions in inches and fractions thereof used to produce the casings and core rings and locating them relative to each other.

Referring more particularly to Fig. 43, it will be noted that the various different radial dimensions shown are based from the common axis A—A of the pump or turbine and that the axial dimensions are taken from a radial reference plane R—R perpendicular to and intersecting the axis A—A and extending along the radially outer channel edge X of the pump or turbine torus portion. Actual axial dimensions are designated numerically in inches and fractions thereof and appear horizontally as calculated from the radial reference plane R—R to the particular points 0–10 or 0′–10′. Actual radial dimensions are also identified numerically in inches and fractions thereof and by the subscript R, each number indicating the distance between the axis A—A and a particular point 0–10 and 0′–10′ on the torus portion. Knowing that the inner curved surface *o* of the casing has a two inch (2″) radius, the axial and radial distances may be plotted from the axis A—A and radial plane R—R, intersection of radial and axial lines establishing a point (0–10) on the surface *o* for reference area-dividing purposes. The inner curved surface *i* of the core ring is located eccentrically to the surface *o* and can be plotted by measuring the linear distances from the axis A—A and the axial distances from the radial reference plane R—R, the intersection of a radial line with an axial line being identified by one of the numbers 0′–10′.

Thereupon, the cross-sectional area-dividing lines 0—0′, .5—.5′, etc., can be identified by connecting the paired points 0—0′, .5—.5′, etc., by straight lines *a*, *b*, *c*, etc., as shown. The angular disposition of each of the lines *a*, *b*, *c*, etc. to vertical lines perpendicular to the axis A—A and intersecting the point 0, .5, 1, 1.5, etc. are as follows:

| Line | Angle | Line | Angle |
|---|---|---|---|
| *a* | 36° | *l* | −61° |
| *b* | 44°50′ | *m* | −54° |
| *c* | 53°25′ | *n* | −47°30′ |
| *d* | 61°35′ | *o* | −40°40′ |
| *e* | 69° 5′ | *p* | −34°10′ |
| *f* | 76°50′ | *q* | −26°50′ |
| *g* | 84°25′ | *r* | −20°30′ |
| *h* | −88°30′ | *s* | −13°50′ |
| *i* | −81°30′ | *t* | − 7°10′ |
| *j* | −74°25′ | *x* | 0° |
| *k* | −67°35′ | | |

The toroidal distance, i. e., the linear distance between points 0–.5, .5–1, etc., defining individual arcs connected together to form the semi-toroidal inner surface *o* of the pump or turbine casing, and the toroidal linear distance between points 0′–.5′, .5′–1′, etc., defining individual arcs joined to form the semi-toroidal outer surface *i* of the pump or turbine core ring or shroud, is as follows:

| *o* | | *i* | |
|---|---|---|---|
| Arc | Distance, inches | Arc | Distance, inches |
| .0–.5 | .278 | .0′–.5′ | .086 |
| .5–1 | .270 | .5′–1′ | .090 |
| 1–1.5 | .261 | 1′–1.5′ | .097 |
| 1.5–2 | .249 | 1.5′–2′ | .105 |
| 2–2.5 | .246 | 2′–2.5′ | .106 |
| 2.5–3 | .240 | 2.5′–3′ | .110 |
| 3–3.5 | .234 | 3′–3.5′ | .117 |
| 3.5–4 | .228 | 3.5′–4′ | .117 |
| 4–4.5 | .228 | 4′–4.5′ | .121 |
| 4.5–5 | .223 | 4.5′–5′ | .124 |
| 5–5.5 | .220 | 5′–5.5′ | .125 |
| 5.5–6 | .220 | 5.5′–6′ | .126 |
| 6–6.5 | .217 | 6′–6.5′ | .129 |
| 6.5–7 | .217 | 6.5′–7′ | .129 |
| 7–7.5 | .215 | 7′–7.5′ | .130 |
| 7.5–8 | .217 | 7.5′–8′ | .129 |
| 8–8.5 | .217 | 8′–8.5′ | .133 |
| 8.5–9 | .212 | 8.5′–9′ | .131 |
| 9–9.5 | .212 | 9′–9.5′ | .133 |
| 9.5–10 | .215 | 9.5′–10′ | .129 |
| Total Distance | 4.619 | Total Distance | 2.367 |

For purposes of identifying the mean flow path M through the torus portion of the pump and turbine, the formula $$\sqrt{\frac{r_o^2+r_i^2}{2}}$$

is used wherein $r_o$=the radial distance of the various points 0, .5, 1, etc. on the arc *o* from the axis A—A, and $r_i$=the radial distance of the various points 0, .5′, 1′, etc. on the arc *i* from the axis A—A. Accordingly, as computed from the formula, the radial distances from the axis A—A to points intersecting the lines *a*, *b*, *c*, etc., are as follows:

| Line | Distance (M) in inches | Line | Distance (M) in inches |
|---|---|---|---|
| *a* | 3.045 | *l* | 4.776 |
| *b* | 3.1626 | *m* | 4.921 |
| *c* | 3.297 | *n* | 5.056 |
| *d* | 3.446 | *o* | 5.176 |
| *e* | 3.602 | *p* | 5.280 |
| *f* | 3.770 | *q* | 5.369 |
| *g* | 3.940 | *r* | 5.440 |
| *h* | 4.114 | *s* | 5.482 |
| *i* | 4.286 | *t* | 5.524 |
| *j* | 4.456 | *x* | 5.542 |
| *k* | 4.619 | | |

Arcs connecting the points on the lines *a*, *b*, *c*, etc. define the mean flow path M.

The toroidal distance between two adjacent points on the reference lines *a*, *b*, *c*, etc. and identifying portions of the arc of the mean flow path M, namely, *a–b*, *b–c*, *c–d*, etc. is .1738 inch, the total toroidal distance of the arc of the mean flow path M, accordingly, being 3.477 inches.

Referring now to Fig. 44 for the dimensions of the torus portion defined by the reaction member, the inner surface *o* of the casing of the reaction member has a two inch (2″) radius the same as the radii of the inner surfaces *o* of the pump and turbine, all of the radii having a common center. The inner surface *i* of the core ring has a radius of 1.510 inches, this radius being struck from a point on the radial reference plane. The axial dimensions, identified numerically in inches or fractions thereof in Fig. 44, are measured from the radial reference plane R, and the radial dimensions are measured from the axis A—A of the converter. The points 0, 1, 2, etc. on the arc or outer border *o* are connected by lines *a′* to *m′*, inclusive, to the points 0′, 1′, etc., the lines $a'$ to $m'$, inclusive, being cross-sectional area-dividing reference lines, the line $a'$ designates the entrance, and the line $m'$ is the exit, of the torus portion provided by the reaction member. The intersection of radial and axial lines, having the lengths indicated in Fig. 44, establish the points 0–10 and 0′–10′.

The toroidal distance, i. e., the linear distance between points 0–.5, .5–1, etc., defining individual arcs connected together to form the inner surface $o$ of the outer casing of the reaction member, and also the toroidal distance between the points 0′–.5′, .5′–1′, etc., are given in the following table:

| Arc | Distance (inches) | Arc | Distance (inches) |
|---|---|---|---|
| 0–1 | .315 | 0′–1′ | .116 |
| 1–2 | .320 | 1′–2′ | .115 |
| 2–3 | .300 | 2′–3′ | .128 |
| 3–4 | .290 | 3′–4′ | .138 |
| 4–5 | .290 | 4′–5′ | .139 |
| 5–6 | .290 | 5′–6′ | .139 |
| 6–7 | .290 | 6′–7′ | .138 |
| 7–8 | .300 | 7′–8′ | .128 |
| 8–8.5 | .160 | 8′–8′.5 | .058 |
| 8.5–9 | .160 | 8.5′–9′ | .057 |
| 9–9.5 | .158 | 9′–9.5′ | .058 |
| 9.5–10 | .157 | 9.5′–10′ | .058 |
| Total Distance | 3.030 | Total Distance | 1.272 |

For purposes of identifying the means flow path M through the torus portion of the reaction member, the formula $$\sqrt{\frac{r_o^2+r_i^2}{2}}$$

is used wherein $r_o$ = the radial distance of the various points 0, 1, 2, etc. on the arc $o$ from the axis A—A, and $r_i$ = the radial distance of the various points 0′, 1′, etc. on the arc $i$ from the axis A—A. The radial distances from the axis A—A to points intersecting the lines $a'$, $b'$, $c'$, etc. are as follows:

| Line | Distance (M) in inches | Line | Distance (M) in inches |
|---|---|---|---|
| $a'$ | 2.990 | $g'$ | 2.717 |
| $b'$ | 2.886 | $h'$ | 2.750 |
| $c'$ | 2.806 | $i'$ | 2.806 |
| $d'$ | 2.750 | $j'$ | 2.852 |
| $e'$ | 2.717 | $k'$ | 2.886 |
| $f'$ | 2.705 | $l'$ | 2.935 |
| | | $m'$ | 2.990 |

It will be apparent that arcs connecting the points on the lines $a'$, $b'$, $c'$, etc. define the mean flow path M.

The toroidal distance between two adjacent points on the reference lines $a'$, $b'$, $c'$, etc. and identifying portions of the arc of the mean flow path M, namely, $a'$–$b'$, $b'$–$c'$, $c'$–$d'$, etc. is .204 inch, the total toroidal distance of the arc of the mean flow path M being 2.40 inches.

The dimensional characteristics of the blades are identified in Figs. 6–8 for the pump blades, in Figs. 21–23 for the tubrine blades, and in Figs. 35 and 36 for the reaction member blades. It will be noted from a consideration of the side views of the pump and turbine blades in Figs. 6 and 21, respectively, that each of the portions of the torus, defined by these blades, is identical, particularly in area, to the torus portion of Fig. 43. The outer and inner surfaces $o$ and $i$ of the torus, defined by the casings and core rings of the pump, turbine and reaction members are identical in curvature to the inner and outer edges $i$ and $o$ of the blades for engagement therewith.

Referring to the views of the pump blade in Fig. 6 and the turbine blade in Fig. 21, it will be seen that the radial reference plane $R_p$ and $R_t$ are perpendicular to the common axes A of the pump and turbine and the axis A—A of the converter, and that the radially outer edge of the pump blade lies in the plane $R_p$ which is also the reference plane R in Fig. 43, and the radially outer edge of the turbine blade lies in the plane $R_t$ which is also the reference plane R in Fig. 43 when the torus portion in Fig. 43 is rotated to lie on the opposite side of the plane R.

The dimensions of the pump and turbine blades, to obtain their desired curvature characteristics, are calculated, as shown in Figs. 7 and 8 and Figs. 22 and 23 by measuring the distances from the radial plane $R_p$ or $R_t$ to the numerically identified area-dividing reference lines, drawn between the points 0—0′, .5—.5′, etc., the points 0–10 being on the outer edge $o$ of the particular blade and comparable to the points 0–10 on the semi-toroidal outer surface $o$ in Fig. 43, and the points 0′–10′ being on the inner edge $i$ of the particular blade at the same locations as the points 0′–10′ on the semi-toroidal inner surface $i$ in Fig. 43. As the axial dimensions are clearly indicated in the various views (Figs. 7 and 8 and Figs. 22 and 23) and the radial dimensions conform to those given in Fig. 43, it is believed no further explanation is required. It may be noted from a consideration of Fig. 21 that the side view of the blade, indicated by solid lines, represents the torus portion of the turbine and that the broken lines indicate the true projected boundaries of the blade obtained by extending axially parallel horizontal lines from the numerically identified points on the edges (Figs. 22 and and 23) of the blade toward or through the solid lines in Fig. 21 and then extending radial vertical lines from similarly numerically identical points on the edges $o$ and $i$ of the blade, the intersection of the horizontal and vertical lines establishing other points which are connected by arcs to provide the resultant curved side edges of blades shown in dotted lines, the radially outer end edge of the blade lying in the same plane ($R_t$) and the radially inner edge of the blade being identified by a dotted line extending between the projected points 0 and 0′. The side view of the pump blade shown in Fig. 6 represents the true boundaries of this blade.

Referring to the stator blade shown in Figs. 35 and 36, the dimensions of this blade to obtain its curvature characteristics are calculated by measuring the axial distance between the radial reference plane $R_r$ to the various portions of the blade as indicated. The plane $R_r$ differs from the radial reference plane R in Fig. 44 illustrating the stator portion of the torus. The radial reference plane $R_r$ in Figs. 35 and 36 extends through the entrance edge of the blade both at its radially inner and outer edges $i$ and $o$ as shown in these views. In Fig. 35, the radially outer edge, indicated at $i$, of the blade conforms to the curvature of the stator portion of the torus indicated at $i$ in Fig. 44, also the radially inner edge, indicated at $o$, in the blade in Fig. 35 conforms to the curvature of the stator portion of the torus indicated at $o$ in Fig. 44. The axial dimensions of the blade, identified in inches and fractions thereof,, appear to be clearly indicated in Figs. 35 and 36 and, accordingly, no further reference thereto in this description is deemed necessary.

The construction of the torque converter having the pump, turbine, and stator blades, casings and core rings, conforming to the above-described and illustrated dimensions, will produce a pump, turbine and stator identical to those shown in Figs. 1–5, 9–16 for the pump; Figs. 1, 17–20, 24–31 for the turbine; and Figs. 1, 32–34, 37–42 for the stator; and, accordingly, the previous general description is applicable thereto.

Fig. 45 illustrates the relationship between the entrance and discharge angles of the pump, turbine and stator blade contour at mean flow line M in Fig. 1 of a converter having the aforesaid dimensions, and these angles are as follows:

| | Entrance Angles $B_1$ | Discharge Angles $B_2$ |
|---|---|---|
| | *Degrees* | *Degrees* |
| Pump Blades | 75 | 75 |
| Turbine Blades | 32 | 30 |
| Stator Blades | 90 | 22 |

Each entrance angle is plotted as the angle between the plane created by the entrance edges of particular blade cascade and contour of the blade mean line, and each of the above discharge angles is plotted as the angle between the plane created by the discharge edges of the particular blade cascade and contour of the blade mean line, as shown in Fig. 45.

The included angles, identified at $B_3$ in Fig. 45, and formed by tangents to the entrance and discharge edges of the blades is 150° for the pump blades, 62° for the turbine blades, and 112° for the stator blades.

Figs. 13–16, 28–31, 40–42 illustrate the angular relationship of the pressure faces of the pump, turbine and stator blades, respectively, to the inner and outer contour walls *i* and *o* defining the converter torus of the torque converter.

Figure 13:
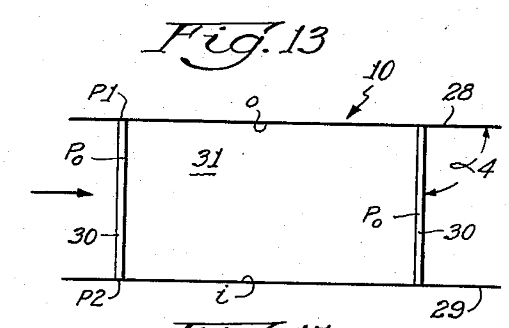
Figure 14:
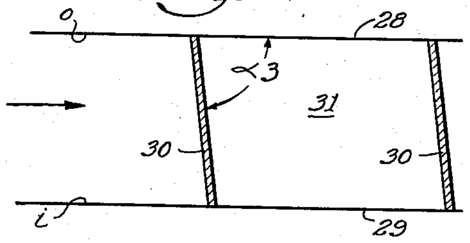
Figure 15:
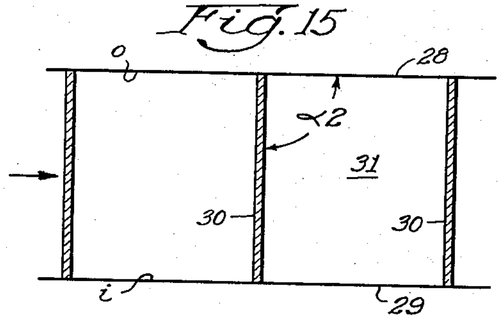
Figure 16:
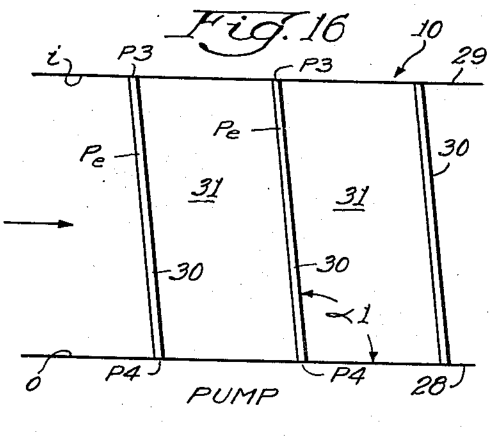

Referring to Figs. 13–16, the pressure face of the entrance portion of each pump blade, as shown in Fig. 16, is at an angle $\alpha_1$ of 96° to the outer border *o*, and gradually changing at angle $\alpha_2$ of 90° at the portion of each pump blade shown in Fig. 15 and located at 3.5—3.5′ in Figs. 6, 7 and 8, then to an angle $\alpha_3$ of 83° at the portion of each pump blade shown in Fig. 14 and located at 6.5—6.5′ in Figs. 6, 7 and 8, and then to an angle $\alpha_4$ of 90° at the exit portion of each pump blade as shown in Fig. 13.

Figure 28:
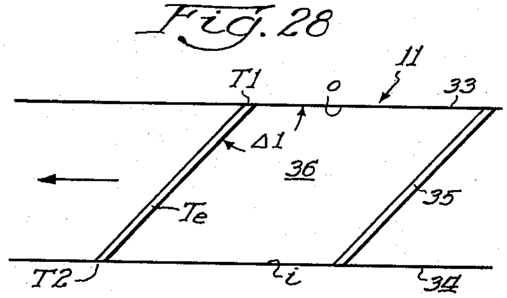
Figure 29:
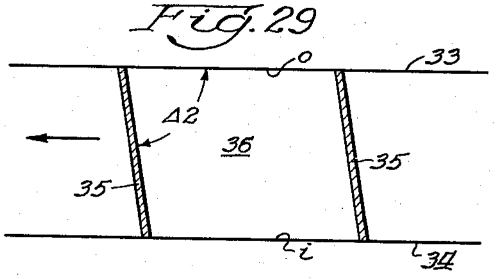
Figure 30:
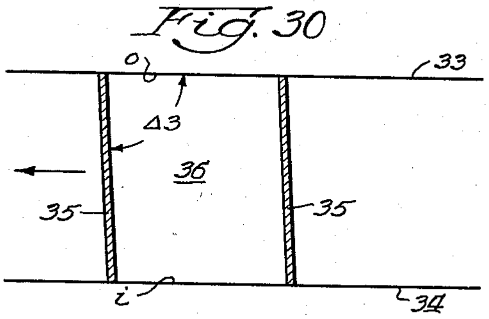
Figure 31:
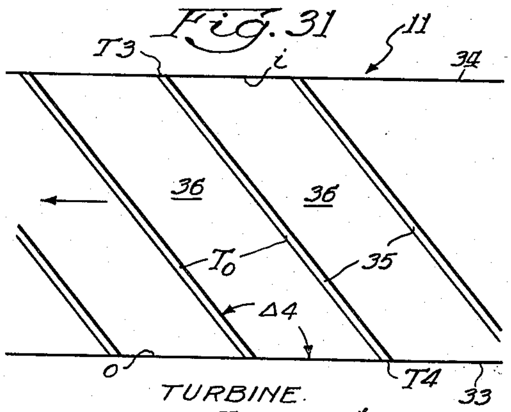

Referring to Figs. 28–31, the pressure face of the entrance portion of each turbine blade, as shown in Fig. 28, is at an angle $\Delta_1$ of 133° to the outer border *o*, changing to an angle $\Delta_2$ of 81° at the portion of each blade shown in Fig. 29 and located at 6.5—6.5′ in Figs. 21, 22 and 23, thence to an angle $\Delta_3$ of 87° at the portion of each blade shown in Fig. 30 and located at 3.5—3.5′ in Figs. 21, 22 and 23, and then to an angle $\Delta_4$ of 128° at the exit portion of each blade as shown in Fig. 31.

Referring to Figs. 40–42, the pressure face of the entrance portion of each stator blade, as shown in Fig. 40 is at an angle $\phi_1$ of 90° to the outer border *o*, changing to an angle $\phi_2$ of 102° in Fig. 41 at the mid-portion of the blades between the ends thereof and at the cross-sectional plane in Fig. 37, and thence to an angle $\phi_3$ of 145° at the exit portion of each blade as shown in Fig. 42.

The pump is provided with 31 blades, the turbine with 33 blades, and the reaction member with 11 blades.

Referring to Fig. 46, the pump, turbine, and stator blades are illustrated as having entrance or inlet and exit or outlet angles as previously described. At the side of each blade is a velocity vector diagram of the relative fluid flow angles at stall and during different portions of the torque converting range and at the coupling point, effected by the moving pump, turbine and stationary stator blade cascades. It may be noted that the diagram "Entrance to pump" reflects the angle of the fluid flow from the outlets or exits of the stator ducts, as controlled by the stator blade exit portions, into the entrance of the pump ducts, the identified reference angle of 22° being the exit or outlet angle of the physical stator blade exit portion; that the diagram "Entrance to turbine" illustrates the angles of the fluid flow from the pump ducts' exits or outlets, as controlled by the pump blades exit portions, into the turbine ducts' entrances; and that the diagram "Entrance to stator" shows the angles of the fluid flow from the turbine ducts' exits or outlets, as controlled by the turbine blade exit portions, into the stator ducts' entrances. The various calculated angles of fluid flow at the junctions between two adjacent bladed elements are given below and conform to the angles in Fig. 46:

| | Angle of Fluid from Exit of Stator into Entrance to Pump | Angle of Fluid from Exit of Pump into Entrance to Turbine | Angle of Fluid from Exit of Turbine Ducts into Entrance to Stator |
|---|---|---|---|
| | *Degrees* | *Degrees* | *Degrees* |
| Stall | 135 | 18½ | 30 |
| .5 Speed Ratio | 116 | 25 | 54 |
| .8 Speed Ratio | 50 | 33½ | 133½ |
| C. P. or Coupling Point at .888 Speed Ratio | 24½ | 39 | 157½ |

In explanation of the vector diagrams and foregoing table, the stall condition of the converter occurs when the pump is driven by the engine, and the load on the turbine prevents rotation of the turbine by the kinetic energy of the fluid circulating in the converter, these various angles being identified by the designation "Stall"; "S. R." is the speed ratio relation of the turbine and pump and determined by dividing the turbine speed by the pump speed; "C. P." is the coupling point of the converter and designates the angular relationships of the blades at the time and speed ratio when the reaction member or stator freewheels by the change in the angular direction of the fluid flow from the turbine to strike the blades of the stator to effect rotation of the stator in the direction of rotation of the pump, the converter then acting as a fluid coupling transmitting, but not converting, torque from the engine to the load.

It may be noted from a consideration of Fig. 46 that the angles of the entrance portions of the pump, turbine, and reaction member blades do not substantially correspond to the resultant discharge angles of the fluid flow from the neighboring blade exit portions at stall, so that shock losses are had between these adjacent blade portions at stall. For example, at the junction of the pump exit and turbine entrance portions, there is about 13° difference at stall between the directions of fluid flow. The fluid flow at this junction does not change quickly with an increase of speed ratio (S. R.), and it is not until substantially .7 speed ratio is reached before this junction becomes shockless. This can be seen from an inspection of Fig. 46, wherein it will be noted that the diagram "Entrance to turbine" shows the angle 33½° of fluid flow from the pump into the turbine at .8 S. R., which angle is substantially equal to that of the inlet angle of 32° of the entrance portion of the turbine blade, the angle of 32° of fluid flow being had between 25° at .5 S. R. and 33½° at .8 S. R. and hence which 32° angle of fluid flow occurs substantially at .7 S. R. A comparison of the angle of fluid flow from the turbine and the angle of the entrance portion of the stator blade will show that shock losses are also had at the juncture of the turbine and stator, the juncture becoming shockless at about .6 S. R. A shock loss is also had at stall at the juncture of the stator and pump, as the angle of fluid flow leaving the stator and entering the pump at stall is 135°, while the angle of the entrance portion of the pump is 75°, the angles substantially corresponding at about 70° at .7 S. R. Summarizing the described angular relationships of the fluid flow from one bladed element to the entrance portions of the blades of the adjacent bladed elements, shock losses are obtained during the initial torque conversion stages (between stall and the coupling point), gradually diminishing until minimum shock losses are had at the highest point of efficiency of the converter between .5 S. R., to the coupling point.

Figs. 47 and 48 are graphs illustrating test data in the form of curves indicating the characteristics of the torque converter. Both graphs illustrate substantially the same characteristics of the converter, with certain exceptions. In Fig. 47, the abscissa shows the turbine wheel speeds in percentages of the pump (or engine) speed, the input torque being 181 foot pounds, as shown. The three lines of ordinates on the left side are one indicating the efficiency, another the torque ratios, and the third ordinate the input speed (R. P. M.). On the right side, the ordinate indicates the input torque in foot pounds, the figures shown being multiplied by 10 for their actual foot pounds values. Fig. 48 differs from Fig. 47 by a comparison of curves of the performance of the converter in relation to the speed of the automotive vehicle expressed in miles per hour (M. P. H.).

Referring first to Fig. 47, at the stall condition of the converter, a torque ratio of approximately 2.1:1 is obtained at engine or input speed of 1500 R. P. M., the input torque is 181 foot pounds, the efficiency is zero, and the turbine speed ratio is zero. In the torque conversion stage, the efficiency curve illustrates that the efficiency of the converter rises rapidly from zero value at stall to a maximum value of 91% at the peak, and thereafter falling slightly to 89% at the coupling point, the input speed rising gradually from 1500 R. P. M. during the torque conversion stage to about 2200 R. P. M. at the coupling point. Thus, the torque converter is particularly characterized by the substantially low motor or input speeds required during the torque conversion stages of the converter, which factor is of paramount importance in its usage with automotive internal combustion engines. The torque converter, acting as a coupling, has a maximum efficiency of 96% as indicated in Fig. 47.

Fig. 48 graphically illustrates the performance of the converter at different speeds in miles per hour (M. P. H.) of the automotive vehicle having a direct drive condition from the converter to the rear wheels of the vehicle. It may be noted that the ordinate at the left side of the graph illustrates the engine input speed in revolutions per minute (R. P. M.), and the ordinate at the right side of the graph illustrates the efficiency of the converter; and the abscissa represents the speeds (M. P. H.) of the automotive vehicle, the conditions shown being determined during acceleration of the vehicle at full throttle of the engine. As in the previous graph of Fig. 47, the maximum torque ratio of 2.1:1 is obtained at an engine input speed of 1500 R. P. M.; and the efficiency of the converter in the torque conversion range rapidly rises from zero at stall to its maximum value of 91% at 2000 R. P. M., then slightly dropping to 88% at 2200 R. P. M. at the coupling point (C. P.) of the converter, where the efficiency rapidly rises to 96% in the coupling range at about 3100 R. P. M. The torque conversion range extends between the stall condition of the converter, when the initial start of the vehicle is had, to the coupling point which occurs at the vehicle speed of 48 M. P. H. The curve designated "Road load slip" shows the slip due to resistance of an automobile on a level road and is the ratio of the output speed to the input speed, with the automobile cruising along a highway at a uniform speed, without accelerating or decelerating. It may be noted the term "slip" is based on the relative speeds of the pump and turbine, the speed of the turbine being always smaller by a small percentage equal to the slip than the speed of the pump.

Fig. 49 graphically illustrates actual comparison tests of the performance characteristics of two torque converters having identical $12\frac{5}{16}$" diameters, under full throttle engine operating conditions, one of the torque converters having pump blades bent backwardly with respect to the rotation of the pump in accordance with a well-known commercial design, and the other torque converter having pump blades, designed in accordance with my invention, bent forwardly with respect to the rotation of the pump.

It is well known that to obtain optimum efficiency in hydraulic torque converters, it is desirable that the kinetic energy of the fluid is controlled by the fluid velocity, that is, an increase in kinetic energy can be obtained by increasing the tangential component of absolute velocity of the fluid. It will be apparent that a pump blade having a fluid discharge portion bent forwardly in the direction of rotation of the pump will act to force the fluid, with considerably greater absolute velocity, into the turbine entrance ducts than a pump blade having discharge portions backwardly bent relative to the direction of rotation of the pump (in the latter case, the blade discharge portions actually reduce the velocity of the fluid entering the turbine entrance ducts), for torque converters of the same size. Accordingly, my novel pump blades produce an increase in the ability to transmit torque for any given input speed. It has been found that an increase in capacity of the present torque converter extends throughout the torque conversion range and through a major part of the coupling range, resulting in high torque-transmitting capacity and high efficiency, particularly in the high speed ratio range of the converter. In the coupling range, the increased capacity of the forwardly bent pump blade is shown by the decreased speed at which it will transmit torque as compared to the backwardly bent pump blade.

Referring to Fig. 49, the curves, designated by solid lines, illustrate the characteristics of my torque converter having forwardly bent pump blades, and the curves identified by broken or dotted lines indicate the characteristics of the torque converter having backwardly bent pump blades, the abscissae and ordinates used are comparable to those previously described with respect to Fig. 47.

An inspection of the comparative performance curves in Fig. 49 clearly illustrates that, for substantially the same torque ratio, the input or engine speed required to obtain the torque ratio by the torque converter having backwardly bent pump blades is substantially greater than the input speed required to realize the same torque ratio by the torque converter having forwardly bent pump blades. This is clearly evident as, considering the stall condition of the converters, the solid curved line identified "Input speed" is about 1325 R. P. M. to obtain the torque ratio of 2.1:1, whereas the dotted curved line identified "Input speed" is about 1850 R. P. M. to obtain the torque ratio of 2.3:1. Also, the engine or input speed gradually rises thereafter in both instances, but it may be noted that the input speed rises, during torque conversion, in both converter types, to 2400 R. P. M. at the coupling point (C. P.) for the torque converter having backwardly bent pump blades and to only 2150 R. P. M. at the coupling point (C. P.) for my design of torque converter. A further important advantage of my torque converter over that using backwardly bent pump blades is that the comparative efficiency curves disclose that, while the efficiency of the converter having backwardly bent pump blades is slightly higher than my converter between the stall point (0) and .5 turbine speed ratio, due to slightly greater shock losses in my converter than in the other converter, this portion of the torque conversion range is seldom used under normal road conditions and, accordingly, may be considered to be negligible in evaluating the performance characteristics of the torque converters. However, the efficiency characteristics of the torque converters are important in the torque conversion range between .5 turbine speed ratio and the coupling point, which range is mostly used under normal road conditions involving passing of vehicles, etc. and it will be noted that, in this range, the efficiency of my torque converter is between 82% to 92%, while the efficiency of the other torque converter is between 82% to 87%. Further, the efficiency of my torque converter is 89% at the coupling point (C. P.), while the efficiency of the other torque converter is about 86% at the coupling point (C. P.), the efficiency curves thereafter indicating a higher efficiency of my converter than the other converter.

Summarizing the foregoing comparison of the performance characteristics of the two types of converters, it can be seen that my torque converter possesses important advantages over a torque converter of the same diameter and utilizing backwardly bent pump blades. Among the most important advantages realized is the low input or engine speeds at stall and throughout the torque conversion range of my converter in comparison to the relatively high constant input or engine speeds required of the torque converter having backwardly bent pump blades, for substantially the same torque ratios at stall and during the torque conversion range.

I claim:

1. A hydraulic torque converter comprising bladed wheels, namely, a pump, a turbine and a reaction member arranged to form a closed fluid circuit in which the pump blade exits and turbine blade entrances are adjacent each other and at substantially the largest circuit radius and the reaction member is between the turbine blade exits and pump blade entrances at substantially the smallest circuit radius, said blades having curvatures providing entrance angles, measured between the middle streamline layer and a surface passing through the entrance ends of the blades, for the pump between 55 to 90 degrees inclined in the direction of rotation of the pump, for the turbine between 20 to 40 degrees inclined counter to the direction of rotation of the turbine, and for the reaction member between 45 to 95 degrees where 45 degrees to 90 degrees is inclined in the direction of rotation of the pump and where 91 degrees to 95 degrees is inclined counter to the direction of rotation of the pump, and said blades having curvatures providing exit angles, measured between the middle streamline layer and a surface passing through the exit ends of the blades, for the pump between 45 to 90 degrees inclined in the direction of rotation of the pump, for the turbine between 20 to 40 degrees inclined counter to the direction of rotation of the turbine, and for the reaction member between 15 to 35 degrees inclined in the direction of rotation of the pump.

2. A torque converter as set forth in claim 1 in which the curvature of the blades changes gradually along the middle streamline layer, the change of the inclined angles, formed by tangents to the middle streamline layer at the entrance and exit, being from 100 to 130 degrees for the pump blades, from 40 to 80 degrees for the turbine blades, and from 60 to 130 degrees for the reaction member blades.

3. A hydraulic torque converter as set forth in claim 1 wherein the pump has from 25 to 35 blades, the turbine from 25 to 35 blades, and the reaction member from 9 to 15 blades.

4. A torque converter comprising rotatable pump and turbine wheels, and a reaction wheel, said wheels having intercommunicating bladed channels defined between inner and outer contour walls for the circulation of a fluid in a toroidal path in which the pump blade exits and turbine blade entrances are adjacent each other at approximately the largest toroidal radius and the reaction member is between the turbine blade exits and pump blade entrances and at approximately the smallest toroidal radius, the blades in each of said wheels being curved and forming in combination certain angles in their mean section between inner and outer borders with the direction of rotation, the angle of the entrance portion of the pump wheel blades being between 65 degrees and 90 degrees inclined in the direction of rotation of the pump wheel, the angle of the entrance portion of the turbine wheel blades being between 25 degrees and 40 degrees inclined counter to the direction of rotation of the turbine wheel and the entrance portion of the reaction wheel blades being between 55 degrees and 90 degrees inclined in the direction of rotation of the pump wheel, the angle of the exit portion of the pump blades being between 70 degrees and 80 degrees inclined toward the direction of rotation of the pump wheel, the angle of the exit portion of the turbine blades being between 25 degrees and 35 degrees inclined counter to the direction of rotation of the turbine wheel, and the angle of the exit portion of the reaction wheel blades being between 19 degrees and 24 degrees inclined toward the direction of rotation of the pump wheel.

5. A hydraulic torque converter comprising a passage for fluid including rotary driving curved vanes, rotary driven curved vanes, and reaction vanes, the driving, driven and reaction vanes being coaxial and juxtaposed and forming a circuit in which the fluid is circulating and transmitting power and in which circuit the driving vane exits and driven vane entrances are adjacent each other at substantially the largest circuit radius and the reaction vanes are between the driven vane exits and the driving vane entrances at substantially the smallest radius, said driving vanes having a discharge angle of approximately 75 degrees inclined in the direction of rotation of the driving vanes and said driven vanes having entrance portions receiving fluid from the driving vanes and being disposed at an angle of approximately 32 degrees inclined counter to the direction of rotation of the driven vanes.

6. A hydraulic torque converter as set forth in claim 1, wherein each of said members define flow channels of substantially parallelogram section between the blades thereof and the inner and outer contour walls thereof, the pump blades being warped in such a way that the pressure face of each blade varies from an angle between 90 degrees and 100 degrees, inclusive with the outer contour wall at the entrance portion of the blade to an angle of substantially 90 degrees with the outer contour wall at the exit portion of the blade.

7. A hydraulic torque converter as defined in claim 1, wherein each of said wheels define flow channels of substantially parallelogram section between the blades thereof and the inner and outer contour walls thereof, the blades being warped in such a way that the pressure face of each pump blade varies from an angle between 90 and 100 degrees with the outer contour wall at the entrance portion of the blade to an angle of generally 90 degrees with the outer contour wall at the exit portion of the blade, the pressure face of each turbine blade having an angle between 120 and 135 degrees with the outer contour wall at the entrance and exit portions of the blade, and the pressure face of each reaction member blade varies from generally 90 degrees with the outer contour wall at the entrance portion of the blade to an angle between 130 and 150 degrees with the outer contour wall at the exit portion of the blade.

8. A hydraulic torque converter comprising a passage for fluid including rotary driving curved vanes, rotary driven curved vanes and reaction vanes, the driving, driven and reaction vanes being coaxial and juxtaposed and forming a circuit in which the fluid is circulating and transmitting power, the exit portions of the driving vanes and the entrance portions of the driven vanes being disposed adjacent each other at substantially the largest circuit radius and the reaction vanes being disposed between the exit portions of the driven vanes and the entrance portions of the driving vanes at substantially the smallest circuit radius, said vanes having curvatures providing angles, measured along the middle streamline layer, said driving vanes having an entrance angle of approximately 75 degrees inclined in the direction of rotation of the driving vanes and a discharge angle of approximately 75 degrees inclined in the direction of rotation of the driving vanes, said driven vanes having an entrance angle of approximately 32 degrees inclined counter to the direction of rotation of the driven vanes and an exit angle of approximately 30 degrees inclined counter to the direction of rotation of the driving vanes, said reaction vanes having an entrance angle of substantially 90 degrees and an exit angle of substantially 22 degrees inclined in the direction of rotation of the driving vanes.

9. A hydraulic torque converter as set forth in claim 8 wherein the driving vanes are between 25 and 35, the driven vanes between 25 and 35, and the reaction vanes between 9 to 15.

10. A hydraulic torque converter comprising rotatable bladed pump and turbine wheels and a bladed reaction wheel, the exit portions of the pump wheel blades and the entrance portions of the turbine wheel blades being disposed adjacent each other at substantially the largest circuit radius and the reaction wheel blades being disposed between the exit portions of the turbine wheel blades and the entrance portions of the pump wheel blades at substantially the smallest circuit radius, the blades of each of said wheels being curved and terminating so that each reaction wheel blade has its entrance edge in a generally radial plane and the outer tip of its exit edge lying ahead of the inner tip of the exit edge in relation to the direction of rotation of the pump wheel, each pump wheel blade has the outer tip of its entrance edge lying in front of the inner tip of the entrance edge in relation to the direction of rotation of the pump wheel, the outer and inner tips of the exit edge of the pump wheel blade being in a generally radial plane, and each turbine wheel blade has the outer tip of its entrance edge lying behind the inner tip of its entrance edge in relation to the direction of rotation of the turbine wheel and the outer tip of its exit edge lying behind the inner tip of its exit edge in relation to the direction of rotation of the turbine wheel.

11. A hydraulic torque converter as defined in claim 8, wherein said passage defines a flow channel of substantially parallelogram section between the vanes thereof and the inner and outer contour walls thereof, the driving vanes being warped in such a way that the pressure face of each vane varies from an angle between 90 degrees to 100 degrees, inclusive, with the outer contour wall at the entrance portion of the vane to an angle of approximately 90 degrees with the outer contour wall at the exit portion of the vane, the portions of the pressure face of each vane between said entrance and exit portions successively varying from an angle between 90 and 100 degrees at the entrance portion to an angle of generally 90 degrees and then to an angle of between 70 degrees and 89 degrees to an angle of generally 90 degrees at the exit portion, with the outer contour wall.

12. A hydraulic torque converter as defined in claim 8 wherein the curved driving vanes directing the fluid into the curved driven vanes at continuously changing angles, measured from a surface passing through the entrance ends of the driven vanes and the direction of the relative fluid flow velocity entering the driven vanes ranging from substantially 20 degrees when the driven vanes are standing still, upwardly when the driven vanes are rotating increasingly faster but slower than the driving vanes to substantially 38 degrees at the coupling point of the driving vanes, driven vanes and reaction vanes.

VLADIMIR J. JANDASEK.

References Cited in the file of this patent

UNITED STATES PATENTS

| Number | Name | Date |
|---|---|---|
| 2,306,758 | Schneider et al. | Dec. 29, 1942 |
| 2,381,187 | Swift | Aug. 7, 1945 |
| 2,410,185 | Schneider et al. | Oct. 29, 1946 |
| 2,610,468 | McGill | Sept. 16, 1952 |

FOREIGN PATENTS

| Number | Country | Date |
|---|---|---|
| 28,507 | Great Britain | Dec. 13, 1906 |
| 414,500 | Great Britain | Aug. 9, 1934 |